US011988356B2

(12) United States Patent
David et al.

(10) Patent No.: US 11,988,356 B2
(45) Date of Patent: May 21, 2024

(54) CEILING-MOUNTED LED LIGHT ASSEMBLY

(71) Applicant: Lightheaded Lighting Ltd., Port Coquitlam (CA)

(72) Inventors: Norm David, Port Coquitlam (CA); Igor Sanabio, Port Coquitlam (CA); Russ Jensen, Port Coquitlam (CA)

(73) Assignee: LIGHTHEADED LIGHTING LTD., Port Coquitlam (CA)

(*) Notice: Subject to any disclaimer, the term of this patent is extended or adjusted under 35 U.S.C. 154(b) by 0 days.

(21) Appl. No.: 18/049,928

(22) Filed: Oct. 26, 2022

(65) Prior Publication Data

US 2023/0060375 A1 Mar. 2, 2023

Related U.S. Application Data

(63) Continuation of application No. 17/320,828, filed on May 14, 2021, now Pat. No. 11,674,649.

(30) Foreign Application Priority Data

Apr. 12, 2021 (CA) ..................................... 3114542

(51) Int. Cl.

| | |
|---|---|
| ***F21S 8/02*** | (2006.01) |
| ***F21V 17/06*** | (2006.01) |
| ***F21V 19/02*** | (2006.01) |
| ***F21V 29/507*** | (2015.01) |
| ***F21Y 105/18*** | (2016.01) |
| ***F21Y 115/10*** | (2016.01) |

(52) U.S. Cl.

CPC .............. *F21S 8/026* (2013.01); *F21V 17/06* (2013.01); *F21V 19/02* (2013.01); *F21V 29/507* (2015.01); *F21Y 2105/18* (2016.08); *F21Y 2115/10* (2016.08)

(58) Field of Classification Search

CPC ........ F21S 8/026; F21V 29/507; F21V 17/06; F21V 19/02; F21Y 2105/18; F21Y 2115/10

See application file for complete search history.

(56) References Cited

U.S. PATENT DOCUMENTS 7,993,034 B2 8/2011 Wegner
8,220,970 B1 7/2012 Khazi et al.
8,403,533 B1 * 3/2013 Paulsel .................. F21V 21/30 362/249.02
8,454,204 B1 6/2013 Chang et al.

(Continued)

OTHER PUBLICATIONS

Pathway Lighting, Caliber Plus Architectural, Series 2LFKNA/2A Adjustable Accent, 2" Aperture 685-1877, Spec 2—Spec Sheet, retrieved from https://www.pathwaylighting.com/products/view/1531 on Aug. 16, 2021, 3 pages.

(Continued)

*Primary Examiner* — Jia X Pan
*Assistant Examiner* — Jessica M Apenteng
(74) *Attorney, Agent, or Firm* — Greer, Burns & Crain, Ltd

(57) ABSTRACT

An LED downlight assembly accommodates square and round trims and its components may be removed irrespective of the presence of mudded in round or square mud plates. The assembly also comprises a collar that can be fitted to ceiling of varying thicknesses.

16 Claims, 42 Drawing Sheets

(56) References Cited

U.S. PATENT DOCUMENTS

| | | | |
|---|---|---|---|
| 8,480,268 B2 | 7/2013 | Wilson et al. | |
| 8,550,669 B2 | 10/2013 | Macwan et al. | |
| 8,602,601 B2 | 12/2013 | Khazi et al. | |
| 8,696,158 B2 | 4/2014 | Santiago et al. | |
| 8,888,326 B2 | 11/2014 | Hatch | |
| 9,091,426 B2 | 7/2015 | Bell | |
| 9,228,709 B2 | 1/2016 | Hatch | |
| 9,228,724 B2 | 1/2016 | Wu | |
| 9,291,319 B2 | 3/2016 | Kathawate et al. | |
| 9,310,038 B2 | 4/2016 | Athalye | |
| 9,523,490 B2 | 12/2016 | Kathawate et al. | |
| 9,557,021 B2 | 1/2017 | Madden et al. | |
| 9,702,516 B1 | 7/2017 | Vasquez et al. | |
| 9,732,947 B1 | 8/2017 | Christ et al. | |
| 9,797,562 B2 | 10/2017 | Dabiet et al. | |
| 9,803,839 B2 | 10/2017 | Visser et al. | |
| 9,822,957 B2 | 11/2017 | Coakley et al. | |
| 9,939,136 B2 | 4/2018 | Vidal | |
| 9,982,855 B1 | 5/2018 | Tan | |
| 10,047,944 B2 | 8/2018 | O'Brien et al. | |
| 10,091,855 B2 | 10/2018 | Van Winkle | |
| 10,234,091 B1 | 3/2019 | Chaimberg et al. | |
| 10,371,329 B2 | 8/2019 | Coakley et al. | |
| 10,408,444 B2 | 9/2019 | O'Brien et al. | |
| 10,462,871 B2 | 10/2019 | Van Winkle | |
| 10,488,016 B2 | 11/2019 | Xie et al. | |
| 10,492,262 B2 | 11/2019 | Van Winkle | |
| 10,502,395 B2 | 12/2019 | Tan | |
| 10,514,139 B2 | 12/2019 | Athalye | |
| 10,544,913 B2 | 1/2020 | Goelz et al. | |
| 10,551,040 B2 | 2/2020 | Shah et al. | |
| 10,634,321 B2 | 4/2020 | Tickner et al. | |
| 10,724,717 B2 | 7/2020 | Warner et al. | |
| 10,738,990 B2 | 8/2020 | Holmes et al. | |
| 10,801,680 B2 | 10/2020 | Dabiet et al. | |
| 10,801,681 B1 | 10/2020 | Chaimberg et al. | |
| 10,823,349 B2 | 11/2020 | Coakley et al. | |
| 10,859,243 B2 | 12/2020 | Simmons, Jr. et al. | |
| 2013/0128608 A1 | 5/2013 | Liao et al. | |
| 2014/0233246 A1 | 8/2014 | Lafreniere et al. | |
| 2016/0320028 A1 | 11/2016 | Paulsel | |
| 2017/0184285 A1* | 6/2017 | Visser | F21V 23/008 |
| 2017/0219200 A1 | 8/2017 | Nolan et al. | |
| 2020/0348001 A1 | 11/2020 | Spicer et al. | |

OTHER PUBLICATIONS

Pathway Lighting, Spec 2—Demo Video, retrieved from: https://www.pathwaylighting.com/upload/education_resources/files/6/video_file_1557846702_2_SalesVideo-Spec2byPathwayLightingFINAL_comp.mp4 on Aug. 16, 2021, 6 pages of screenshots provided.

Pathway Lighting, Spec 2—Brochure, retrieved from: https://www.pathwaylighting.com/upload/brochure/brochures_1611764933_brochures_1557753265_PathwaySpec2Brochure_Links.pdf, on Aug. 16, 2021, 8 pages.

Soraa Arc, 3.5" LED Fixed Recessed Downlight 120VAC (50mm Lens)—Product Specifications, retrieved from: https://www.soraa.com/assets/specsheets/soraa_arc_downlight-fixed_50_120V.pdf, on Aug. 16, 2021, 6 pages.

* cited by examiner

CEILING-MOUNTED LED LIGHT ASSEMBLY

RELATED APPLICATIONS

This application is a continuation of, and claims priority under 35 U.S.C. 120 from U.S. patent application Ser. No. 17/320,828, filed on May 14, 2021, which claims the benefit of priority to Canadian Patent Application No. 3114542, filed Apr. 12, 2021, all incorporated by reference.

BACKGROUND

This invention relates to ceiling recessed LED downlights.

Ceiling-mounted recessed LED downlights typically comprise an LED light module or light engine, a power supply/driver, a heat sink coupled to the light engine, an optics housing that houses a reflector and/or a lens to diffuse or focus the light, the optics housing coupling to the light engine and heat sink, and a trim to provide a finished appearance to an opening in the ceiling. The assembly may also include mechanical components to allow the assembly to be pivoted or swiveled within a ceiling housing installed in the ceiling. A mounting collar is usually installed about the ceiling opening for securing the assembly in the ceiling. A ceiling housing is mounted above the ceiling to retain the driver and the other fixture elements and to isolate the lighting components from ceiling insulation and other above-ceiling features.

The ceiling housing is typically a rectangular metal box mounted to the ceiling joists, with an opening at the bottom of the box that coincides with the intended shape of the ceiling opening, which in turn depends on the style of downlight and trim to be used. The housing typically has either a round hole or a square hole on its bottom surface. The housing is installed after the framing is done but before the ceiling is finished and ceiling finishers will cut an opening in the ceiling corresponding to the hole in the housing. A collar or mounting ring that is compatible with the shape of the opening is installed about the opening. The shape of the hole in the housing therefore constrains the shape of the ceiling opening, which in turn constrains the shape of the collar and the form factor of the light engine and heat sink, the optics housing and the trim that can fit into the collar.

In new construction, the driver is usually fixed to the inside of the ceiling housing before the ceiling is finished. The driver must be compatible with the light engine and once the housing and driver are installed above the finished ceiling, the choice of driver further constrains the later selection of compatible light engines.

In some cases, a trimless finish is achieved by mudding over a round mud ring or a square mud plate that is installed about the ceiling opening. The shape of the mud ring must match the shape of the ceiling opening and of the collar and its shape provides a further constraint on the shape of the optics housing that can fit past the mud ring and into (or out of) the collar.

The light engine, heat sink and the optics housing can be inserted through the opening to be retained to the collar or otherwise against the ceiling, provided the footprint and form factor of the optics housing matches that of the collar and the light engine is compatible with the earlier-installed driver.

The shape of the collar also constrains the shape of trim that can be fit into or over the collar. There are typically either round or square trims. A round trim that includes upwardly extending structure (for example a reflective or decorative wall extending upward from the annular flange of the trim) requires a round collar and trim that includes a square-edged upwardly extending structure requires a collar that accommodates the square edges. In terms of appearance, fitting a square trim over a round annular flange of a collar requires a square trim aperture that is smaller than the round trim and a flange that is broader to avoid seeing the round flange between the aperture corners. If seeking interchangeability of the square and round trim, the aspect ratios of the two would be asymmetrical and less appealing.

One example of a conventional recessed light system that can accommodate both a round and square trim is disclosed in U.S. Pat. No. 10,859,243 to Simmons, Jr. et al. Simmons, Jr. et al. discloses a modular recessed light system comprising a frame which secures a mounting ring on the top surface of the ceiling, and receives a ceiling collar with a circumferential flange that abuts the underside of the ceiling. The mounting ring and collar combine to sandwich the ceiling opening. Clamps on the collar engage with slots on the light module to retain the light module in a recessed relationship with the ceiling. A round or square trim can be releasably retained to the housing of the light module by magnets, with the flanges of the trim hiding the circumferential flange of the collar. Instead of a trim, a mud plate may also be mounted over the circumferential flange and mudded over for a trimless look. The structure disclosed in Simmons, Jr. et al. results in round and square trims that have several asymmetrical components.

As a result of the foregoing constraints, the selection of ceiling housings, the installation of the driver in the ceiling housing and the choice of collar and mud ring require planning and coordination early in the design and construction process and significantly constrain the selection of a type and style of light engine, heat sink, optics housing and trim after the ceiling is finished. In many cases, construction delays mean that the type and style of lighting must be predetermined long before construction completes and provides no accommodation for a change in lighting preference.

It is an object of the invention to provide greater flexibility in selecting shapes and styles of downlights after a ceiling is finished to avoid the need to pre-select the downlight style long before the ceiling is finished.

It is another object of the invention to provide a downlight assembly that allows for the installation of an empty housing (without a driver fixed to the inside of the housing) above a finished ceiling and the later selection of different lighting styles and drivers after the ceiling is finished.

It is a further object of the present invention to provide a light assembly and collar that can accommodate both a round or square trim having aesthetically pleasing similar aspect ratios.

It is a further object of the invention to provide a downlight assembly and collar in which the optics housing and the components that are coupled to it can be installed or removed when either a round or a square mud plate of similar aspect ratios have already been mudded into the ceiling.

It is a further object of the invention to provide a downlight collar that can be installed to ceiling of varying thicknesses after a ceiling is finished.

These and other objects will be better understood by reference to this application as a whole. Not all of the objects are necessarily met by all embodiments of the invention described below or by the invention defined by each of the claims.

SUMMARY

LED downlight components in accordance with the present invention allows for the pre-installation of an empty lighting housing such that a driver and the lighting components can be installed after the ceiling finished, including components having either a square or a round form factor. The lighting components are also adapted to accommodate both round and square trims and to be installed or removed past square or round mud rings/mud plates. This allows the ceiling to be finished while retaining the ability to later vary the selection of lighting styles.

A ceiling collar for mounting an LED downlight assembly into the ceiling comprises a cylindrical sleeve with a flange structure extending outwardly from a bottom edge of the sleeve for abutting the underside of the ceiling. The flange structure comprises gaps and adjacent cut-outs or notches extending into the cylindrical sleeve, the gaps and cut-outs coinciding with four corners of a square thereby allowing the collar to accommodate trims having upward extending portions that have either a round or a square footprint, including trim having similar aspect ratios.

When a square trim of the similar aspect ratio as a round trim is installed, the gaps and cut-outs or notches of the collar allow the upwardly extending portions of the trim to be seated in the collar without interference between the flange structure and four edges/corners of the upwardly extending portions.

The flange structure between the gaps may have straight edges coinciding with the four straight edges of a square. As a result, when a square trim or mud plate is used, the flange structure of the collar does not extend past the outer perimeter of the square flange of the square trim or mud plate, and is hidden behind the square trim/mud plate.

The optics housing comprises a frusto-spherical shell that may contain optical components such as a conical reflector and lens. The rim of the shell forms an abutment surface that abuts an insertion stop of the collar when the optics housing is inserted through the collar, preventing it from being inserted any further into the ceiling. The insertion stop is preferably formed by a circumferential shoulder on the inner surface of the collar. A retaining ring is coupled to the collar against the bottom of the shell to hold the rim of the shell between the insertion stop and the retaining ring.

The retaining ring is metallic so as to magnetically couple with magnets on the trims such that the trims can be releasably installed against the downlight assembly. The retaining ring is a multi-piece composite ring, preferably comprising two semi-circular parts that together define the ring. This makes it possible to disassemble and remove the ring through a relatively small square ceiling opening when a square mud plate is mudded in.

The collar includes an interior shoulder that is used to receive the heads of screws used to pivot retaining feet and threaded bores to receive trimless plate mounting screws. The interior surface of the shoulder defines a seat for the retaining ring. The shoulder is also interrupted by gaps that allow the placement of retaining ring screws on the retaining ring seat and such gaps coincide with the cut-outs in the collar to further avoid obstruction when using a trim having square upwardly extending structures.

The shell of the optics housing may comprise four flattened sides and a rim having four flattened sides allowing the shell to be removed past an already mudded-in square mud plate.

The collar may comprise two or more pivotable feet on the top side of the collar. The feet are retracted when inserting the collar into the ceiling opening and then are deployed outward to engage the top surface of the ceiling or the bottom surface of the ceiling housing. The feet are mounted on screws that extend through to a bottom-facing portion of the collar to be accessible from below. The feet are bored and threaded fully through so as to be reversible on the screw. The feet are asymmetrically shaped such that reversing the orientation of the feet on the screws provides greater or lesser clearance to against the top surface of the ceiling when the screw is tightened. This feature allows the use of the same collar and feet on ceilings of different thicknesses. The asymmetrically shaped feet are also preferably bored and threaded at opposite ends of the feet to provide even more flexibility on the thickness of ceilings that they can accommodate.

The shell of the optics housing may further comprise a side opening that extends to the rim of the shell to avoid contact between the shell and a reflector surrounding the light engine when the light engine is tilted. The rim of the shell includes a thinned portion that partly defines a rim gap in the shell to also avoid contact between the shell and a stationary reflector mounted to the light engine when the light engine is tilted.

A pivoting arm is mounted on the collar adjacent the insertion stop such that it rests on the abutment surface of the shell rim. When the shell is rotated about the collar, the pivoting arm slides against the abutment surface until it hits a rotation stop protruding from the outer surface of the shell thereby acting as a rotation limit stop.

A base of the shell includes a pivotable abutment wedge mounted on a screw. The abutment wedge can be pivoted outward to wedge the base of the shell against an inner side of the collar thereby locking the shell and the optics housing against rotation in relation to the collar.

The optics housing may further comprise a spring-loaded shield at the top of the shell. As the light engine of the downlight assembly is tilted in relation to the optics housing, the shield is drawn across the top of the shell to cover a portion of an opening of the optics housing that would otherwise be revealed by the tilt of the optics housing.

In one aspect the invention is a collar for mounting a downlight assembly in a ceiling. The collar comprises a cylindrical sleeve insertable in an opening in the ceiling, a flange structure extending outward around a bottom edge of said sleeve for abutting against an underside of the ceiling and at least four equally spaced gaps in said flange structure, said gaps being positioned to accommodate the four corners of a first square in said gaps.

The collar may have a flange structure comprising four flange elements each of said flange elements comprising a straight edge, the straight edges of said elements lying along the sides of a second square. The flange structure may further comprise curved edges lying along the perimeter of a circle. The cylindrical sleeve may comprise four equally spaced cut-outs about one end of said sleeve, each of said cut-outs being aligned with, and adjacent to, respective ones of said gaps. One end of each of said cut-outs may have a width corresponding to the width of an adjacent one of said gaps.

The collar may comprise a first circular shoulder about the interior of said sleeve, said shoulder comprising bores for receiving threaded fasteners. In a more particular aspect, the collar may include a second circular shoulder inboard of said first circular shoulder, said second circular shoulder comprising a flat surface that is orthogonal to a longitudinal axis of said sleeve for seating a ring on said surface.

The collar may comprise a circular shoulder about the interior of said sleeve, said shoulder comprising a flat surface that is orthogonal to a longitudinal axis of said sleeve for seating a ring on said surface.

In another aspect of the invention, the sleeve of the collar may comprise at least two feet pivotally coupled to an end of the sleeve that is distal from said flange structure, each of said feet adapted to engage with an upper surface of the ceiling to clamp said ceiling between said flange structure and said feet, each foot having a through bore and being asymmetrically shaped such that reversal of the foot about a screw threaded into said bore varies the thickness of ceiling that may be clamped by said feet.

In another aspect, the invention is a downlight optics housing for mounting in a ceiling, comprising a frusto-spherical shell having a rim, a perimeter of said rim comprising four equally spaced flattened rim surfaces.

The shell may have four equally spaced flattened shell surfaces that are parallel with respective ones of said rim surfaces.

In another aspect, the invention is a retaining assembly for mounting a downlight assembly in a ceiling. The assembly comprises a cylindrical collar for being secured about an opening in the ceiling, the collar comprising an abutment surface protruding inward from an inner surface of the collar for abutting a portion of said downlight assembly when the downlight assembly is inserted through the collar, whereby to limit the insertion of said downlight assembly through said collar. A removable retainer assembly is mountable to an inner surface of the collar for securing said downlight assembly against said abutment surface so as to retain said downlight assembly in said collar, said retainer assembly forming a composite ring comprising two separable half rings.

In a more particular aspect of the invention, the retainer may be magnetically couplable to a magnet in a trim. The downlight assembly may be swivelable about the collar between abutment surface and said retainer when said downlight assembly is secured by said retainer against said abutment surface.

In another aspect, the invention is a downlight lighting assembly for mounting into a ceiling. The assembly comprises a heat sink and a light source coupled to said heat sink. An optics housing is positioned below said heat sink and said light source, said heat sink being tiltably coupled to said optics housing by at least one arm. The optics housing comprises an opening for light from said light source to emit through said opening and a shield lying horizontally about said opening, said shield being coupled to the arm by a spring, whereby tilting of the heat sink draws the shield across at least part of said opening.

In yet another aspect, the invention is a kit for a downlight assembly. The kit comprises a collar as described above, an optics housing retainable in the collar, a square trim comprising a square flange, said flange being dimensioned such that outer edges of said square flange coincide with the straight edges of the flange elements of the collar, and a round trim, said round trim comprising a perimetral flange dimensioned such that an outside edge of said perimetral flange coincides with the curved edges of the collar flange elements.

In a more particular aspect, the collar further comprises a circular shoulder about the interior of said sleeve, said shoulder comprising a flat surface that is orthogonal to a longitudinal axis of said sleeve for seating a ring on said surface. A removable retainer assembly is mountable to said flat surface for securing said downlight assembly against said abutment surface so as to retain said downlight assembly in said collar, said retainer assembly forming a composite ring comprising two separable half rings.

In a further aspect, the invention is a kit comprising an optics housing as described above, a square mud plate having a square annulus, a round mud plate having a round annulus, the frusto-spherical shell of the optics housing being dimensioned to allow said shell to pass through said round mud plate and said flattened shell surfaces and said flattened rim surfaces being dimensioned to allow said optics housing to be pass through said square annulus.

The foregoing was intended as a summary only an of only some of the aspects of the invention. It was not intended to define the limits or requirements of the invention. Other aspects of the invention will be appreciated by reference to the detailed description of the embodiments.

BRIEF DESCRIPTION OF THE DRAWINGS

The preferred embodiment of the invention will be described by reference to the drawings thereof, in which.

DETAILED DESCRIPTION

Figure 1B:
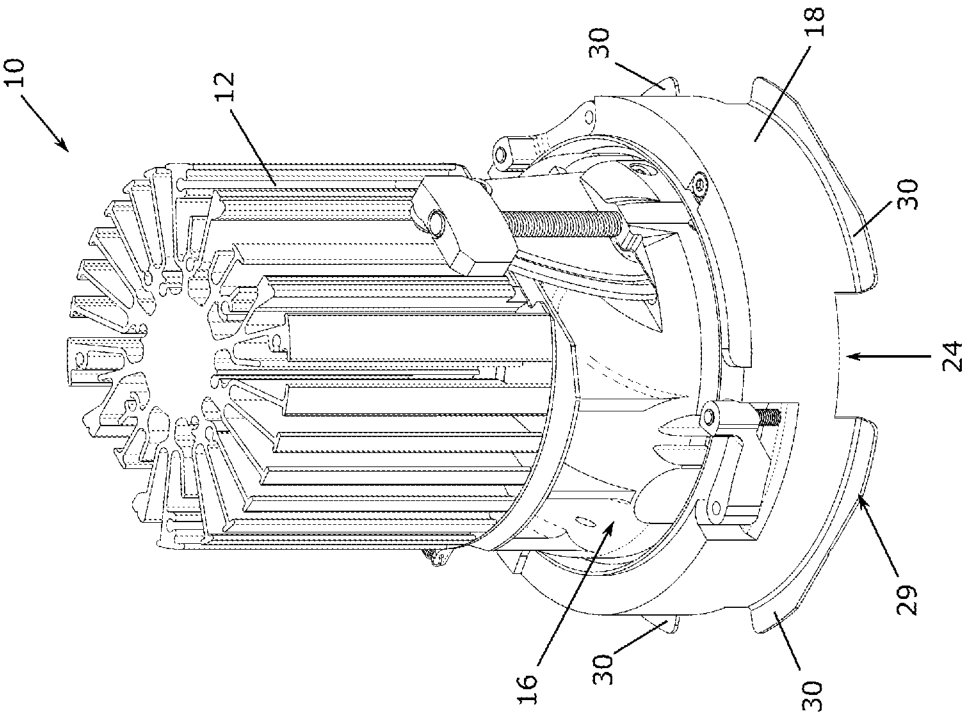
FIGS. 1A & B are perspective views of the downlighting fixture assembly according to the preferred embodiment.

Referring now to the drawings, relationships between different elements in the figures may be referred to by how they appear and are placed in the drawings and as the components would be installed in a ceiling, such as "up", "upward", "down", "downward", "top", "bottom", "left", "right", "above", "below", "inner", "outer", "upper", "lower", and the like.

Figure 1A:
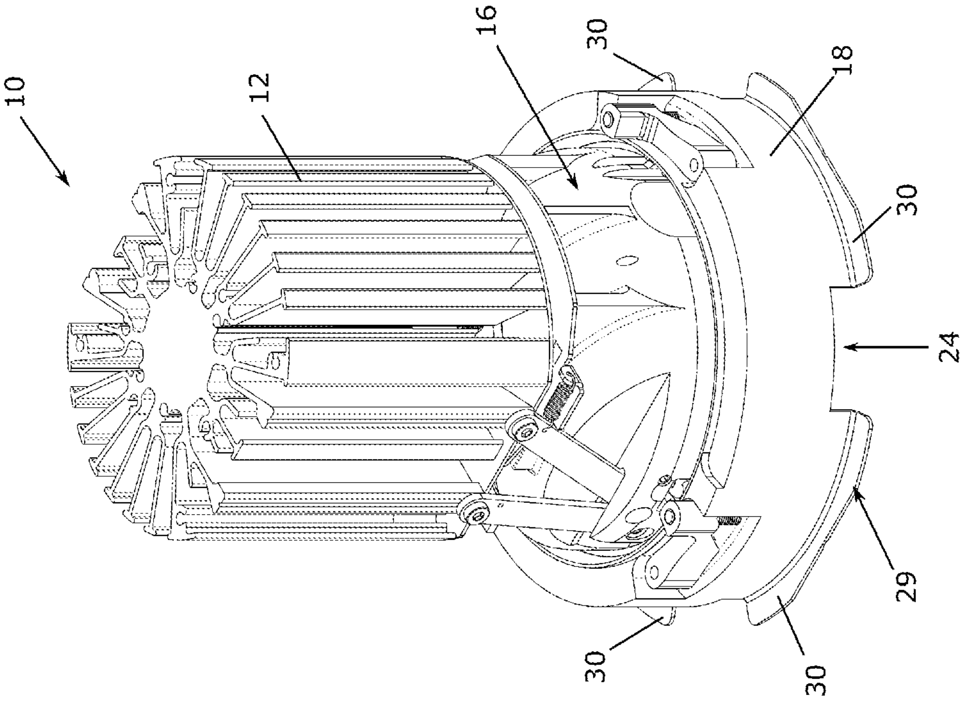
Figure 2:
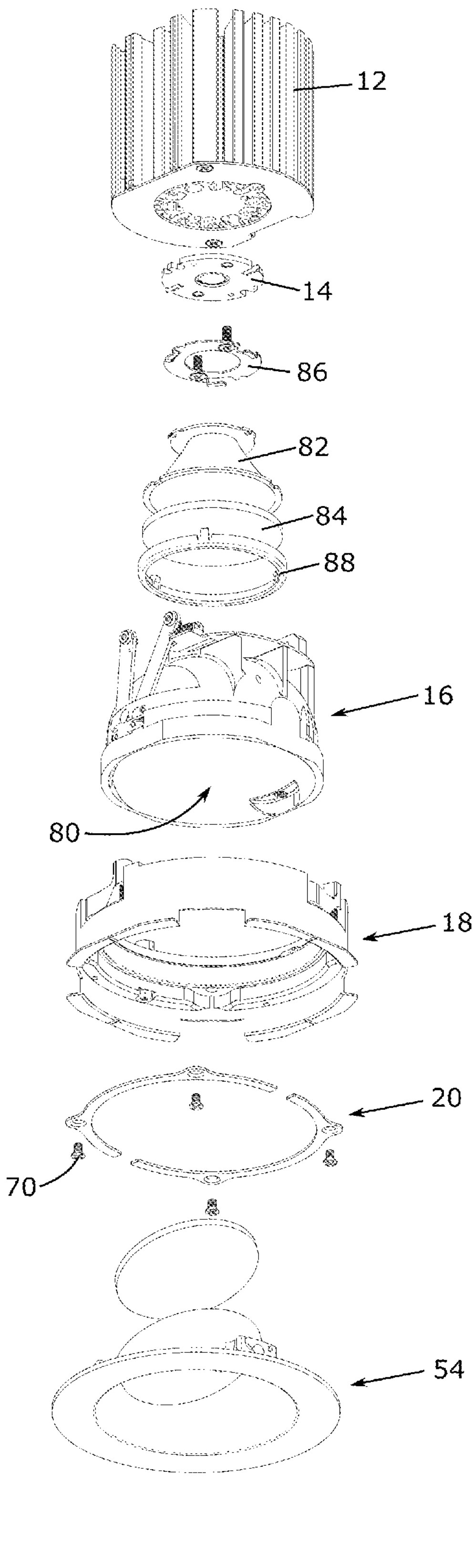
FIG. 2 is an exploded view of the assembly of FIG. 1.
Figure 3:
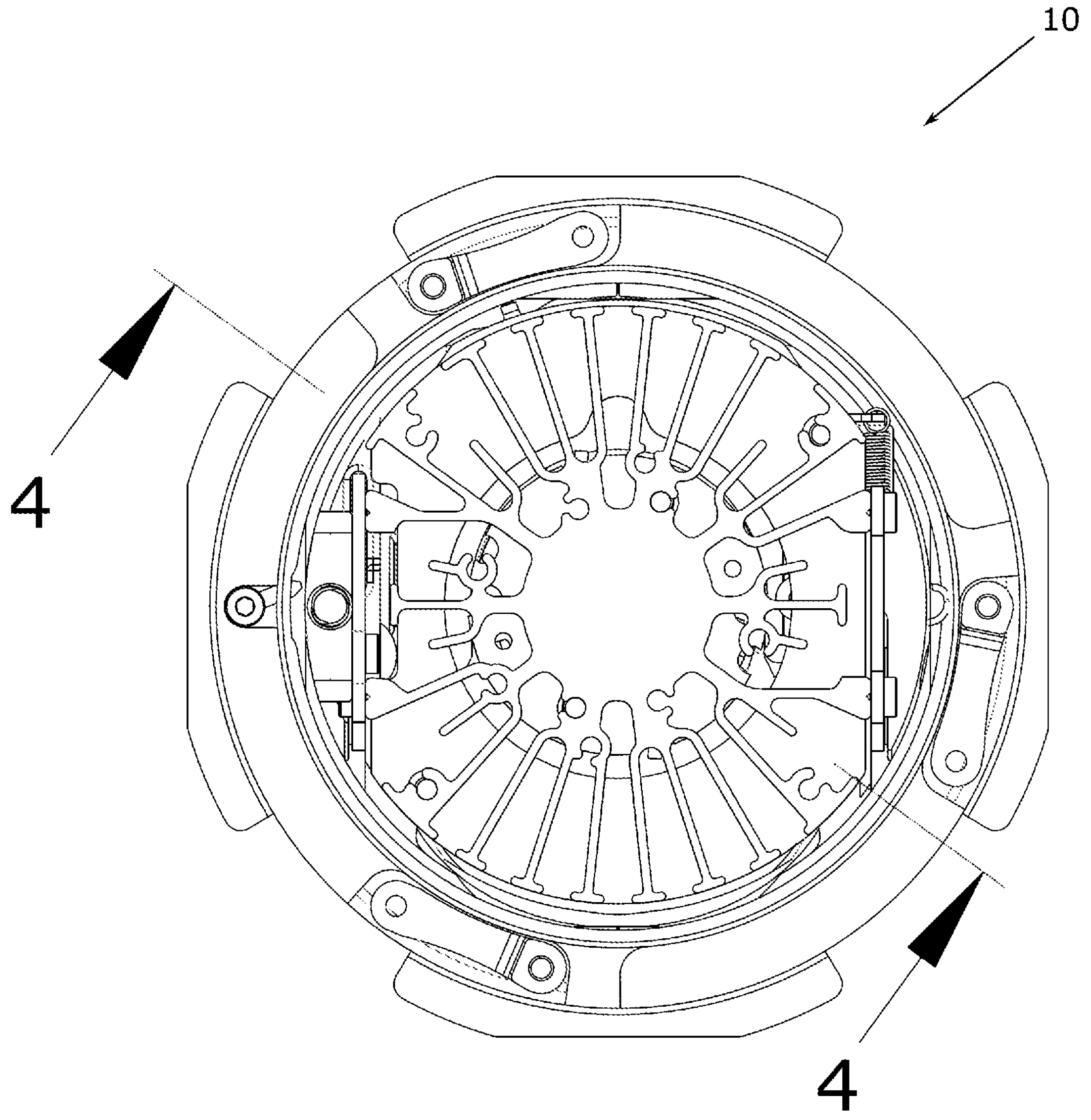
FIG. 3 is a top view of the assembly.
Figure 25B:
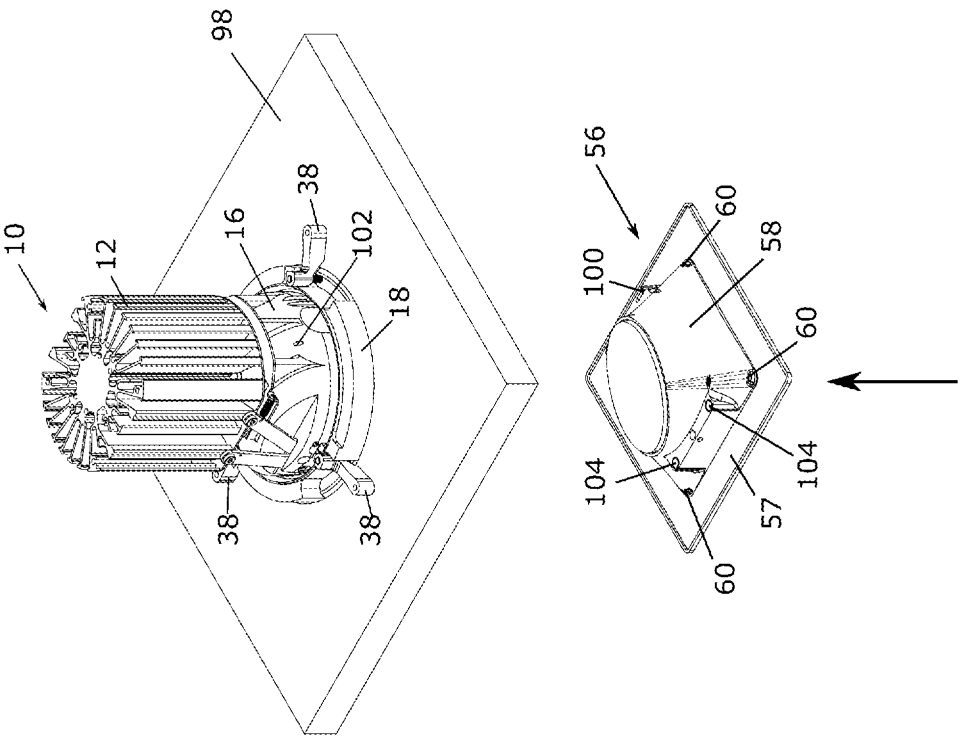
FIGS. 25A & B are perspective views of a square trim being attached to the assembly in the ceiling.
Figure 25A:
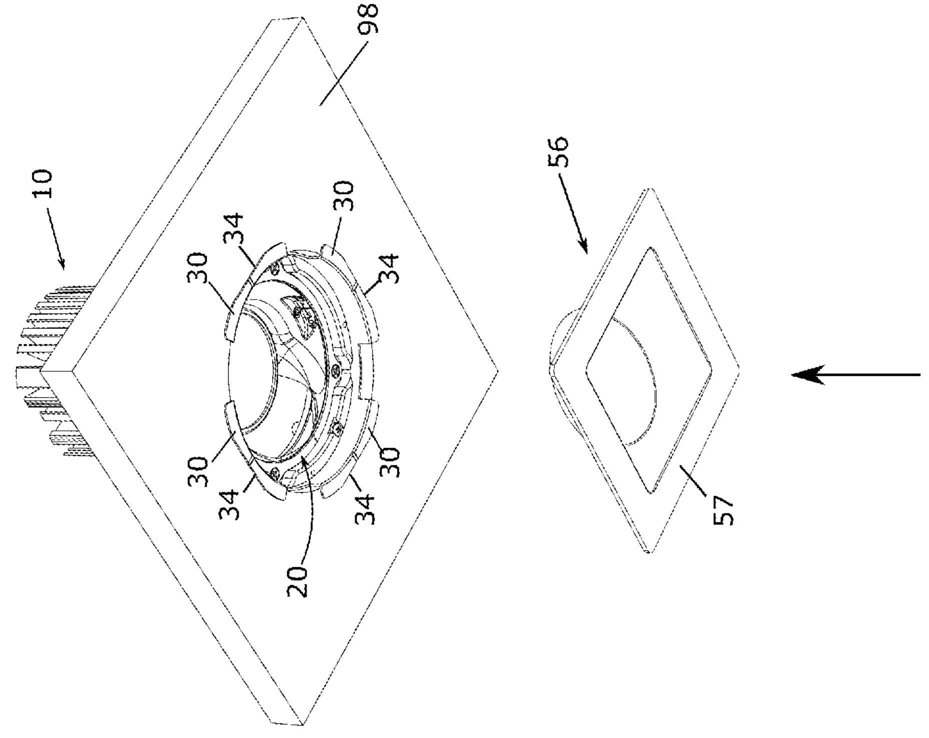
Figure 26:
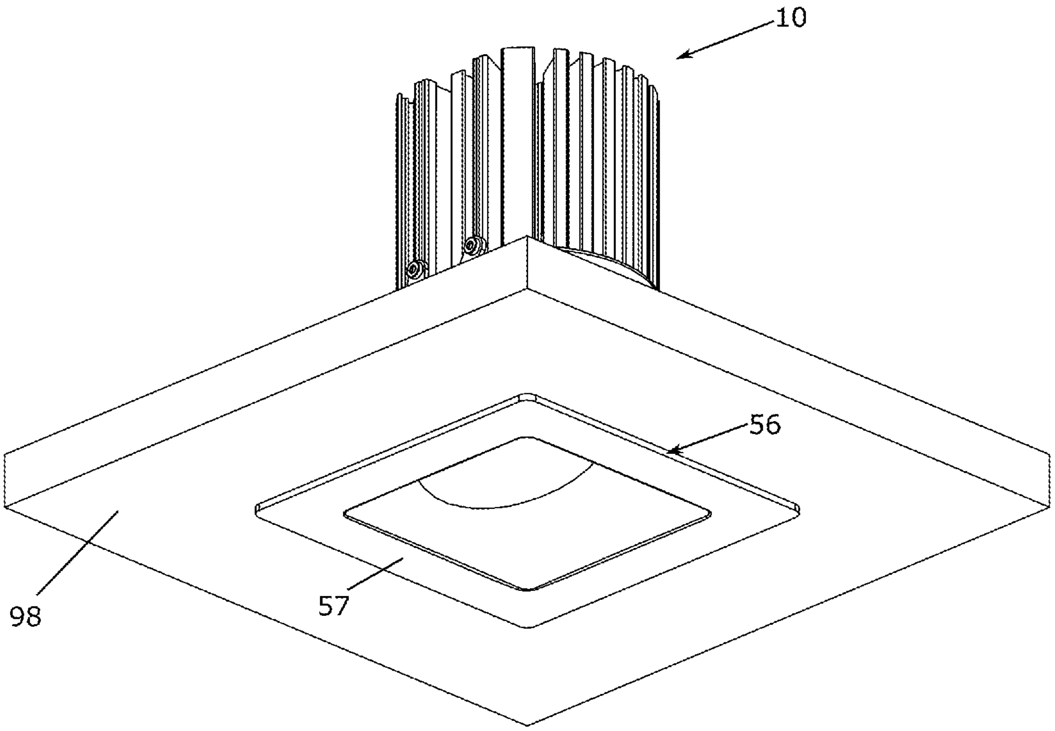
FIG. 26 is a bottom perspective view of the assembly installed in the ceiling with a square trim attached.
Figure 30B:
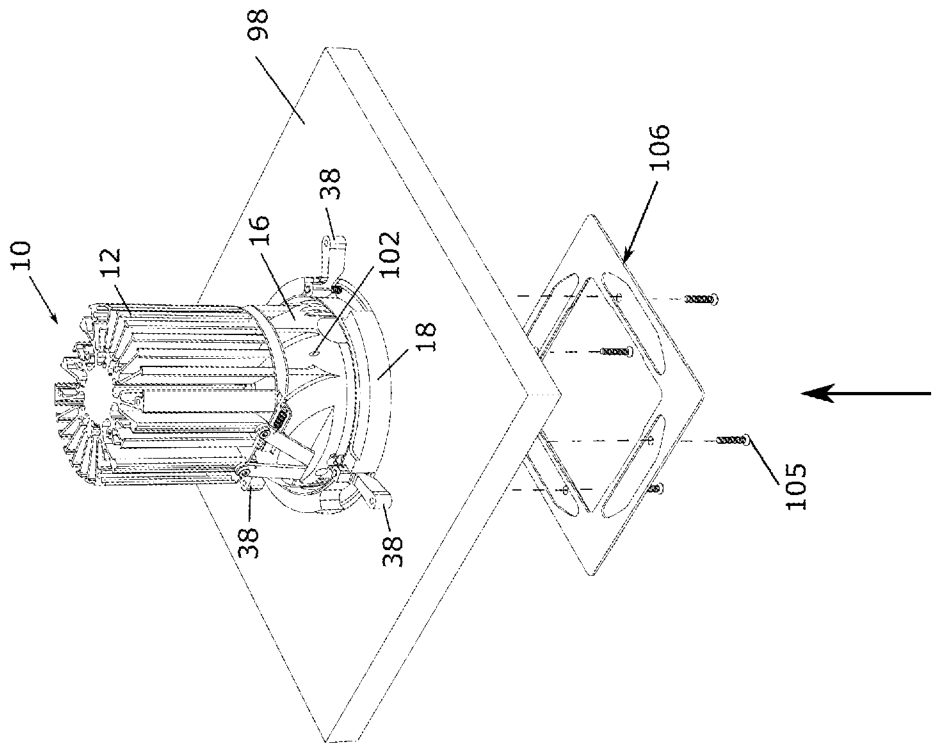
FIGS. 30A & B are perspective views of a square mud plate being attached to the assembly in the ceiling.
Figure 30A:
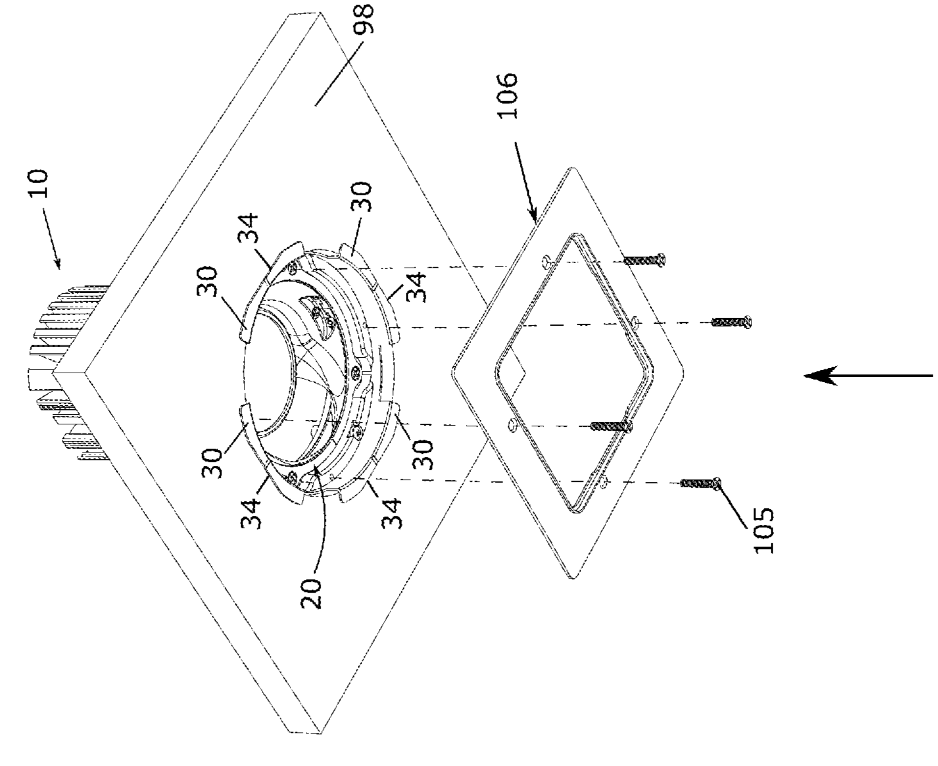
Figure 31B:
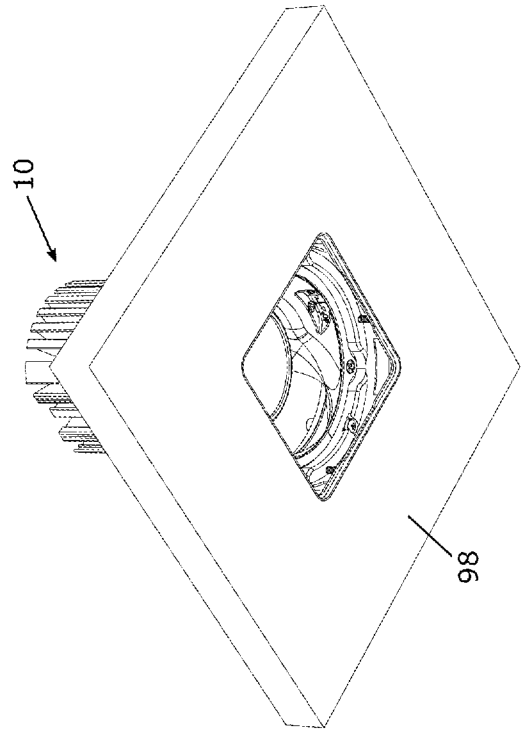
FIG. 31B is a bottom perspective view of the square mud plate mudded into the ceiling.
Figure 31A:
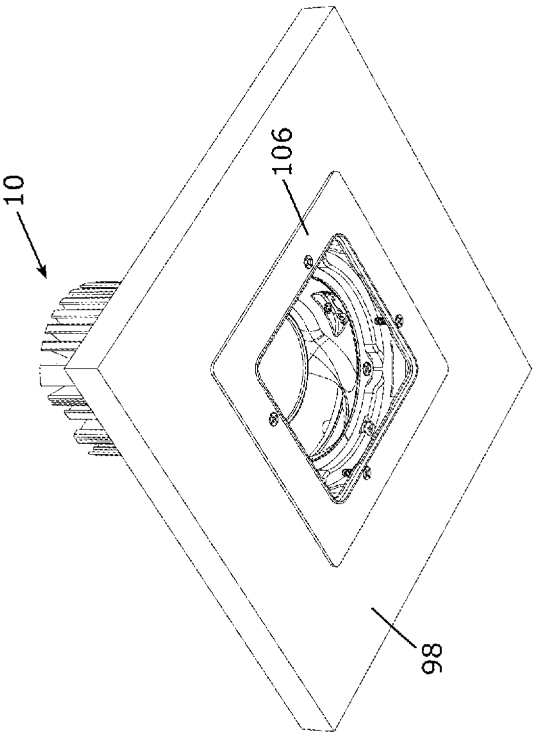
FIG. 31A is a bottom perspective view of the square mud plate installed in the ceiling.
Figure 32:
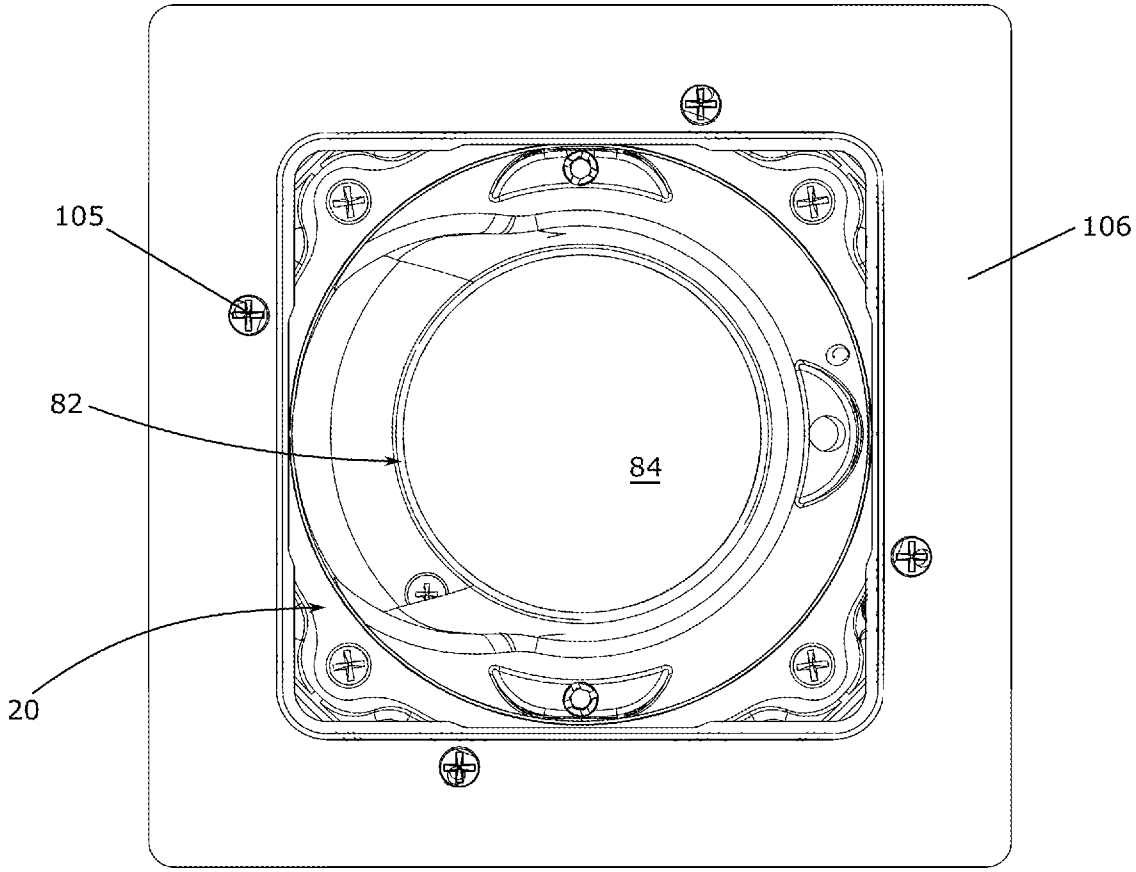
FIG. 32 is a bottom view of the square mud plate installed in the ceiling (before mudding in)

Referring to FIGS. 1 and 2, a downlight assembly 10 according to the preferred embodiment comprises a heat sink 12, an LED light source 14 coupled to the bottom of the heat sink 12, an optics housing 16, a collar 18, and a retaining ring 20. The fixture 10 is completed with a trim (54 in FIG. 23, and 56 in FIG. 25) or a trimless look is provided using mudded-in rings or plates (106 in FIG. 30).

The LED light source or engine 14 may comprise a plurality of light emitting diodes (LEDs) mounted on a printed circuit board, which may be provided as, for example, a Surface Mounted Device (SMD) LED chips and a Chip-on-Board (COB) module. The light engine 14 may also consist of an integrated module that includes an LED-carrying substrate, and integrated power conditioning electronics and control.

FIGS. 12-19 show several views of the collar 18 according to the preferred embodiment. Referring to FIGS. 12A and 12B, the collar comprises a cylindrical sleeve 22 that is insertable in a ceiling opening. Four equally spaced cut-outs or notches 24 extend from a bottom edge 26 of the cylindrical sleeve and into the sleeve wall. The cut-outs 24 accommodate the corners of a square-footprint structure extending upwardly from a trim installed over and into the collar 18, such as is described and illustrated below in relation to FIGS. 27-29.

A flange structure 28 comprising a plurality of flange elements 30 extends outward perpendicularly to and around the bottom edge 26 of the cylindrical sleeve 22 for abutting the underside of the ceiling. According to the invention, the flange structure 28 comprises equally spaced gaps 32 aligned with the cut-outs 24 of the sleeve 22 and coinciding with the four corners of a square. The cut-outs 24 preferably have a width 25 corresponding to a width 33 of an adjacent gap 32.

Figure 15A:
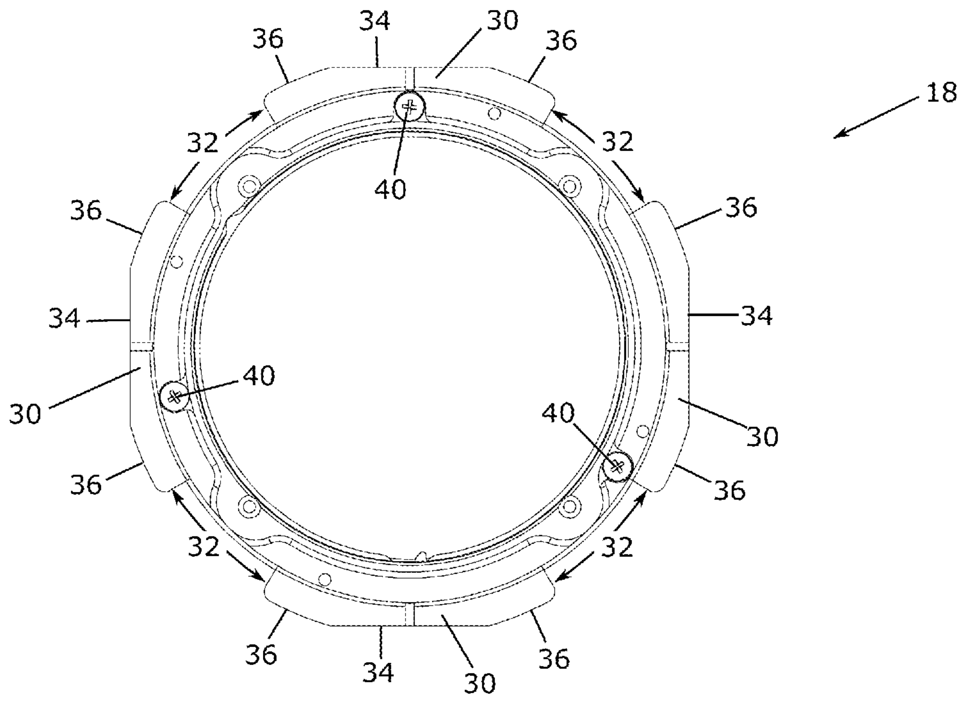
FIGS. 15A & B are bottom views of the collar (A is with the feet tucked in/disengaged, and B is with the feet flipped out/deployed)

Referring to FIGS. 15 & 17, two pairs of opposed flange elements 30 each have a straight outer edge 34 between two curved edges 36. Referring to FIG. 16B, the straight edges 34 allow that, when a square trim or mud plate 31 is attached, the flange elements 30 do not extend past the outer perimeter of the square and remain hidden behind the trim/mud plate. The flanges of a square trim are dimensioned so that the outer edges 35 of the square trim flanges lie substantially along, and coincide with, the straight edges 34 of the flange elements 30. Referring to FIG. 16A, the curved edges 36 may lie parallel to (i.e. concentric with) the outer edge 37 of the flange of a circular/round trim or mud plate 39. The flange of a round trim or mud plate may be dimensioned accordingly.

Figure 17A:
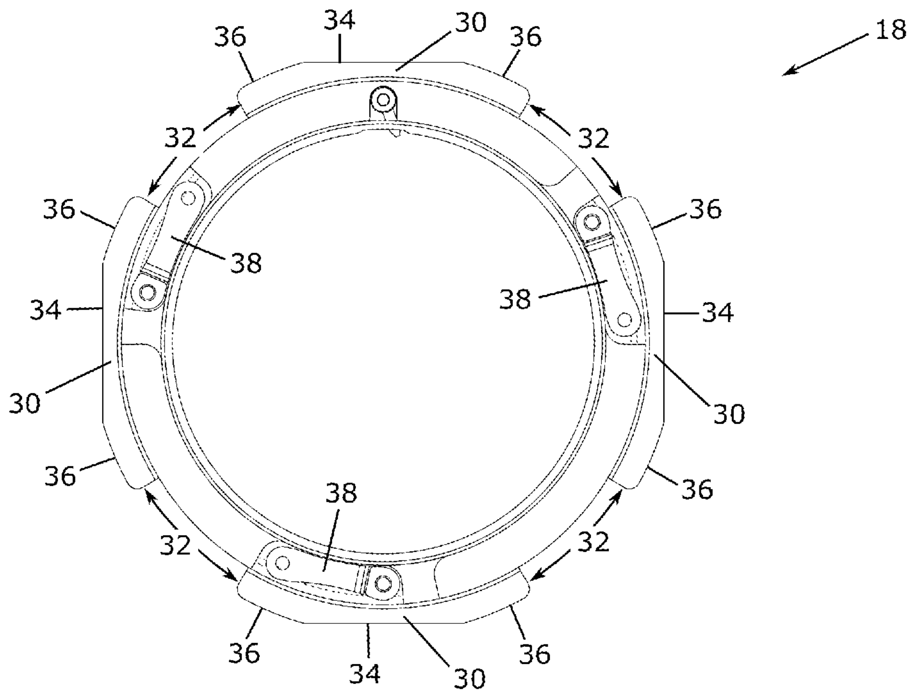
FIGS. 17A &B are top views of the collar (A is with the feet tucked in/disengaged, and B is with the feet flipped out/deployed)
Figure 17B:
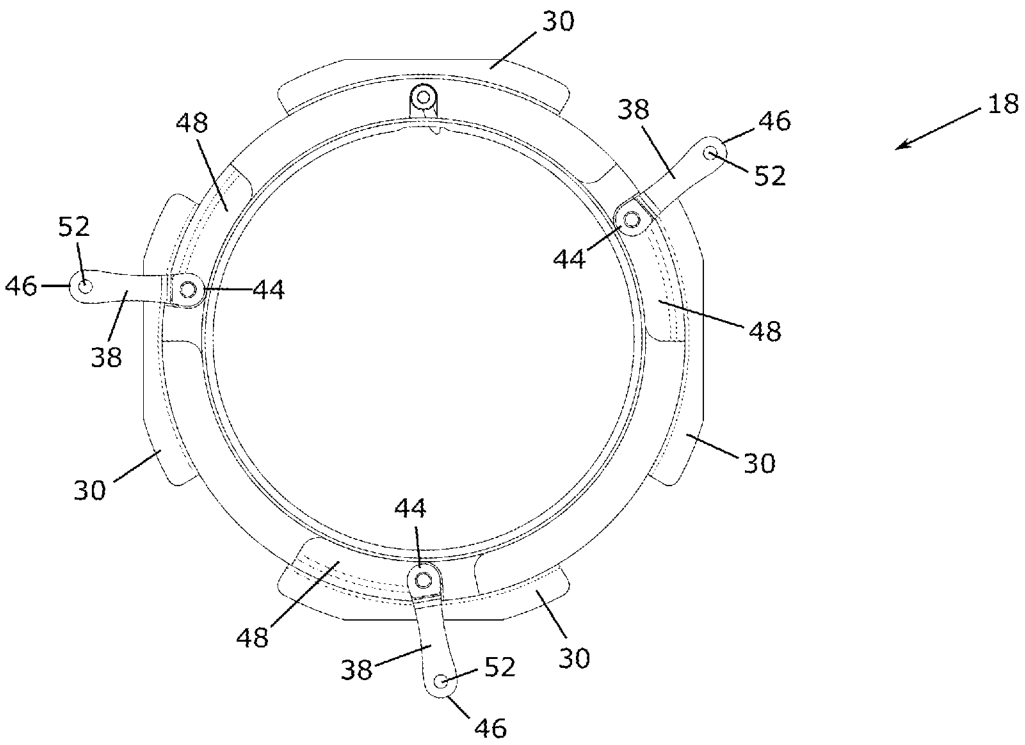

To hold the collar 18 in place about the ceiling opening, one or more pivotable feet 38 are provided on the top side of the collar 18. The feet 38 are pivoted to be retracted inward toward the collar axis (as shown in FIG. 17A) when inserting the collar into the ceiling opening and then are pivoted to deploy them outward as shown in FIG. 17B to engage the top surface of the ceiling or the bottom surface of the ceiling housing. The feet 38 are mounted on screws 40 that extend through to a bottom-facing portion of the collar as at 42 to be accessible from below. The feet 38 are bored and threaded fully through so as to be reversible on the screws 40. The feet 38 are asymmetrically shaped such that reversing the orientation of the feet 38 on the screws 40 provides greater or lesser clearance to the top surface of the ceiling. This feature allows the use of the same collar and feet on ceilings of different thicknesses.

The asymmetrically shaped feet 38 are also preferably bored and threaded at opposite ends 44 and 46 of the feet 38 to provide even more flexibility on the thickness of ceilings that they can accommodate.

Referring to FIG. 17B, the collar 18 further comprises a number of recesses 48 (preferably the same number as the number of feet 38) along the outer surface of the cylindrical sleeve 22 to receive the feet 38 when they are retracted. The recesses 48 allow the feet 38 to sit generally flush with the outer surface of the cylindrical sleeve 22 (as shown in FIG.

17A) such that they do not impede the insertion of the collar into the ceiling opening. Once the collar 18 is inserted in the ceiling opening, the screws or other fasteners 40 may be tightened to engage the feet 38 against the top of the ceiling.

Figure 15B:
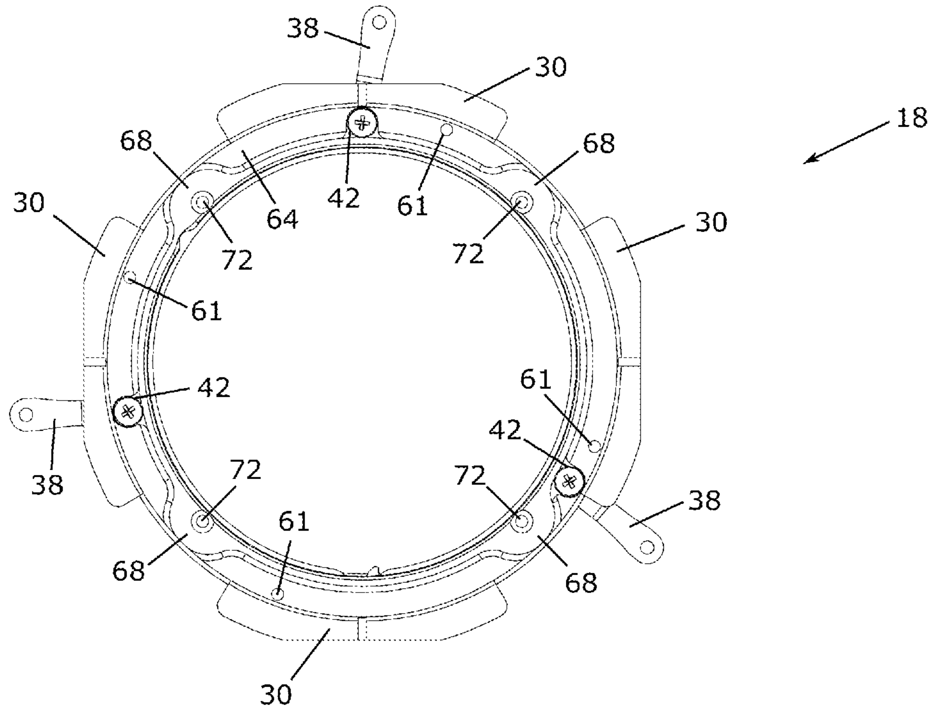
Figure 16A:
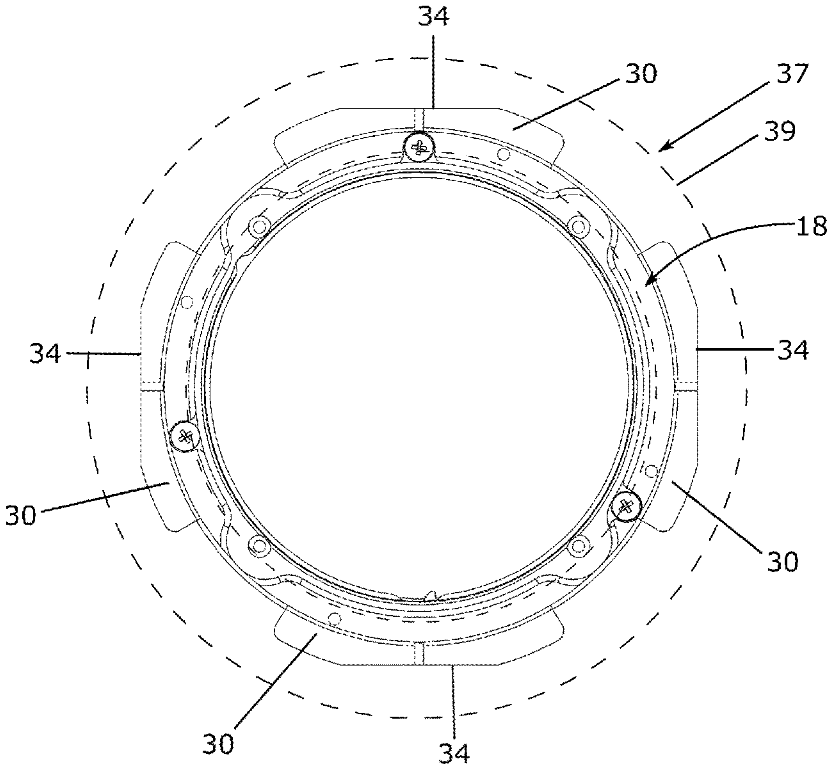
FIGS. 16A & B are bottom views of the collar with an outline of where a round trim or mud plate, and a square trim or mud plate would typically be installed.
Figure 16B:
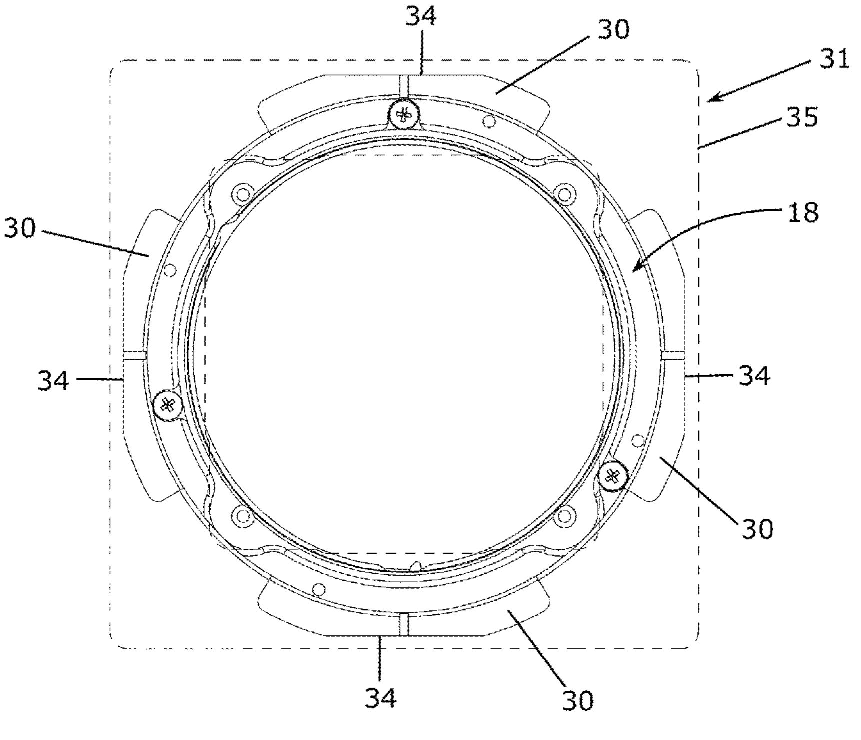

Referring to FIGS. 15B & 17B, tightening the screws 40 swings the feet 38 outward generally perpendicular to a tangent of the outer surface of the cylindrical sleeve 22. Further tightening of the screws 40 causes the feet 38 to press downwards against the top surface of the ceiling thereby clamping the ceiling between the feet 38 and the flange elements 30.

Figure 18A:
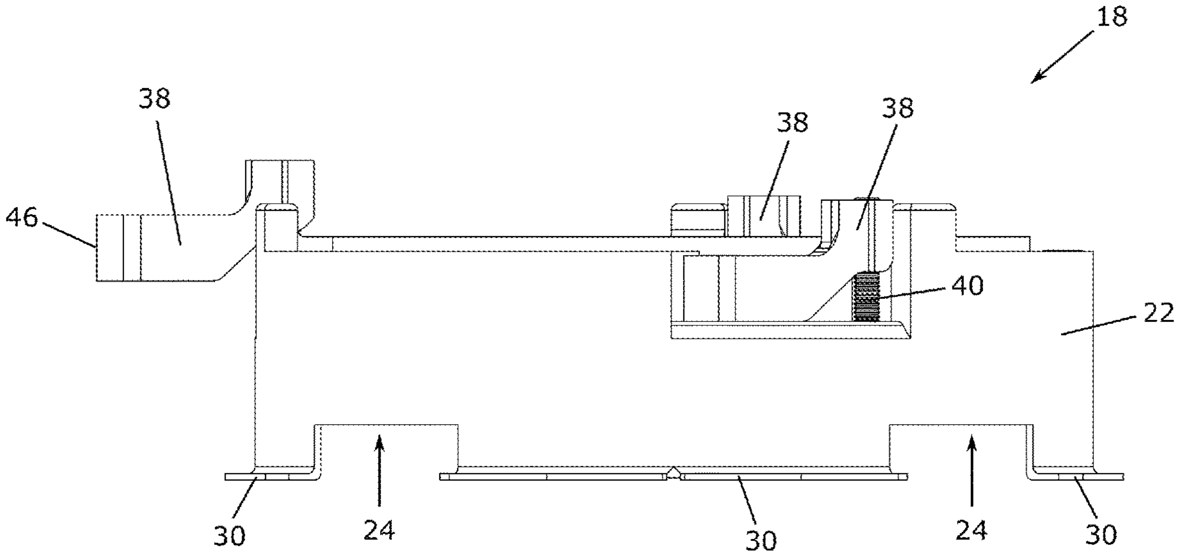
FIGS. 18A & B are side views of the collar, showing the feet installed in a standard orientation.
Figure 18B:
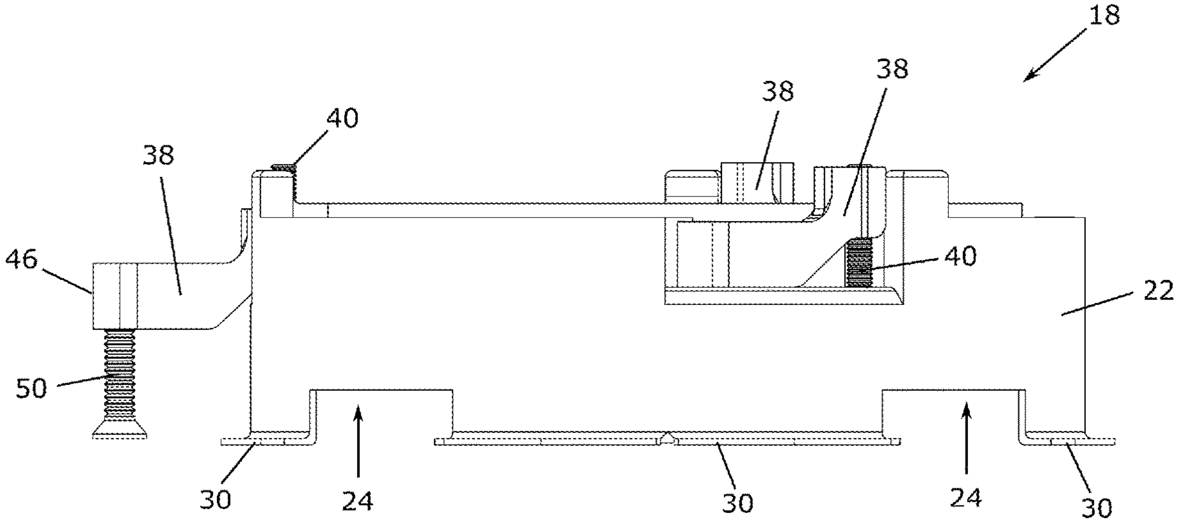

Referring to FIG. 18A, the standard feet 38 can accommodate ceiling thicknesses from ½" to ⅞". Referring to FIG. 18B, to accommodate even thinner ceilings of less than ½" in thickness, a screw 50 may be threaded through an aperture 52 at the distal end 46 of each foot 38 such that when the foot 38 is deployed, the head of the screw 50 engages the top surface of ceiling. The ceiling would therefore be clamped between the flange elements 30 of the collar 18 and the screws 50 (which are attached to the feet 38).

Figure 19A:
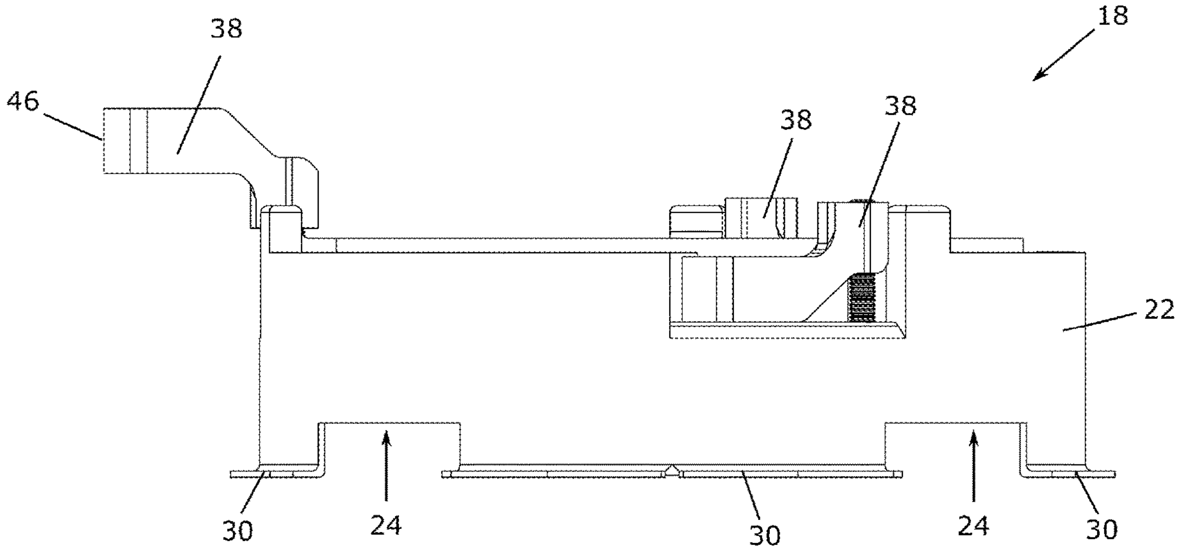
FIGS. 19A & B are side views of the collar, showing the feet installed in a reversed orientation upside down.
Figure 19B:
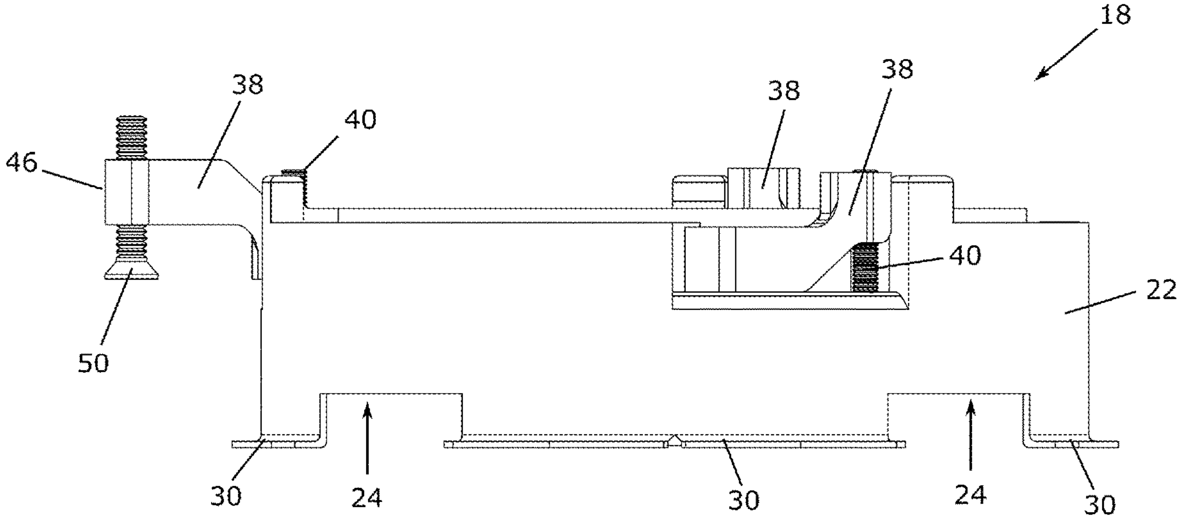

Referring to FIG. 19A, for ceilings that are thicker than usual, the feet 38 are asymmetrically shaped such that they can be installed in a reversed orientation upside down to accommodate ceilings from 1" to 1⅜" in thickness. Similar to the standard installation in FIG. 18, referring to FIG. 19B, in the reversed orientation, a screw 50 may be used at the distal end 46 of each foot 38 to further accommodate ceiling thicknesses of ¾" to 1".

Figure 27:
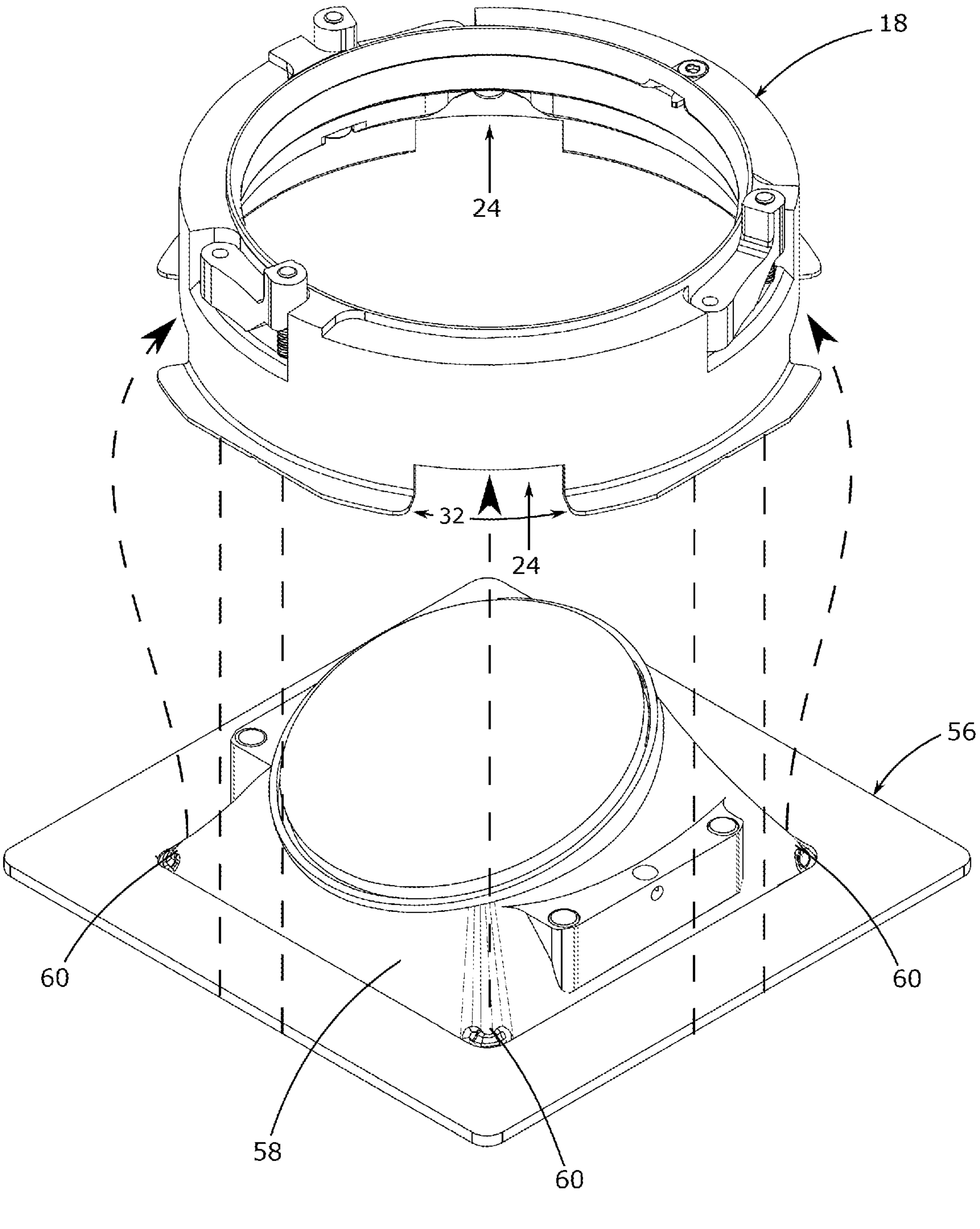
FIG. 27 is a perspective view of a square trim under the collar.
Figure 28:
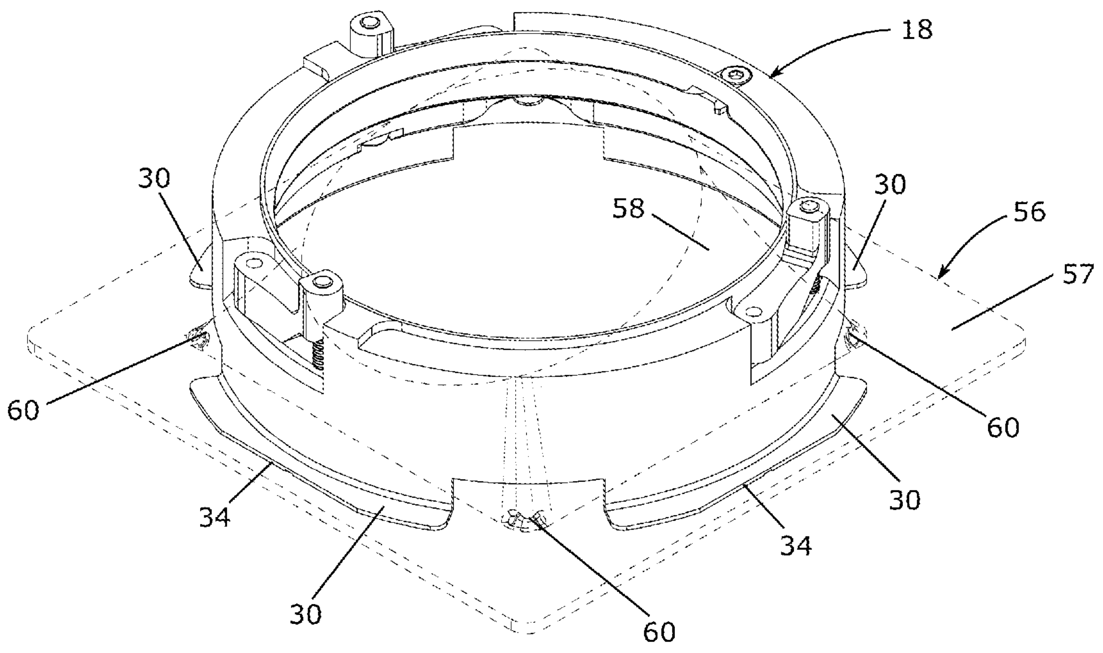
FIG. 28 is a perspective view of the collar with an outline of a square trim.
Figure 29:
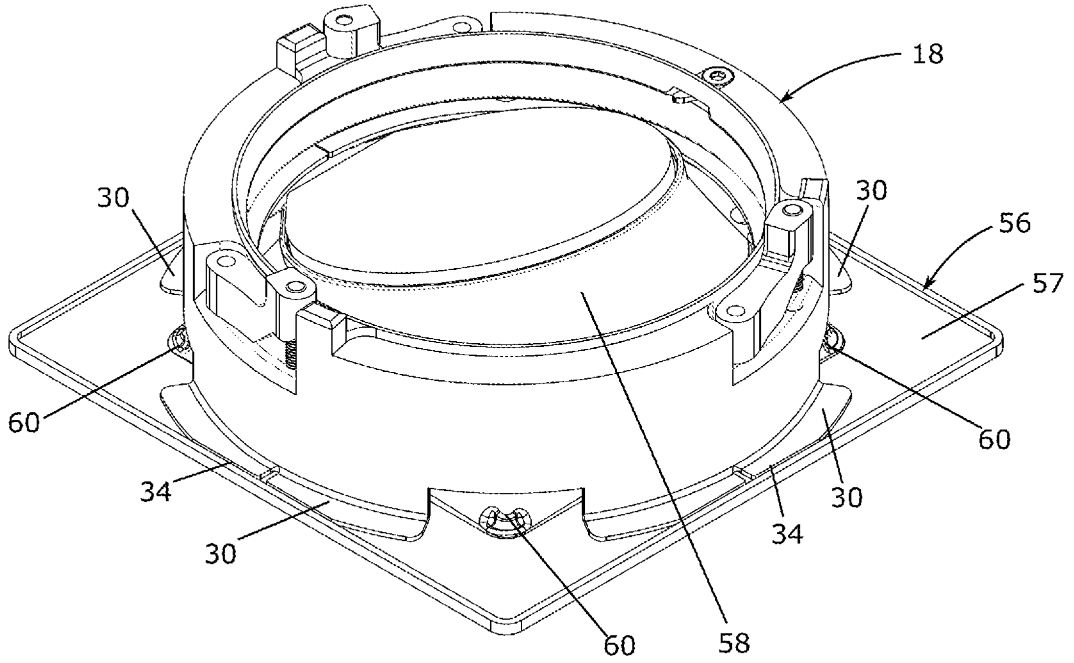
FIG. 29 is a perspective of a square trim sitting within the collar.

The collar 18 according to the invention enables the use of a round or a square trim of similar aspect ratios (i.e. similar flange width, similar aperture size, similar steepness of secondary reflector walls). FIG. 16A shows an overlay of a round trim 54 in dotted outline on a collar 18 and FIG. 16B shows a square trim 56 in dotted outline on the collar. FIG. 27 shows a square trim 56 beneath the collar 18 having an upwardly extending structure comprising secondary reflector walls 58 with the corner edges 60 of the upwardly extending structure 58 aligned to fit into the notches 24 and gaps 32 of the collar 18. FIG. 28 shows the collar 18 and a dotted outline of where the square trim 56, including the upward extending structure 58 and its corners edges 60, would be seated within the collar 18. FIG. 29 shows a square trim 56 seated within the collar 18, showing the corner shoulder 60 of the secondary reflector 58 seated in the notches 24 of the collar 18.

Figure 14:
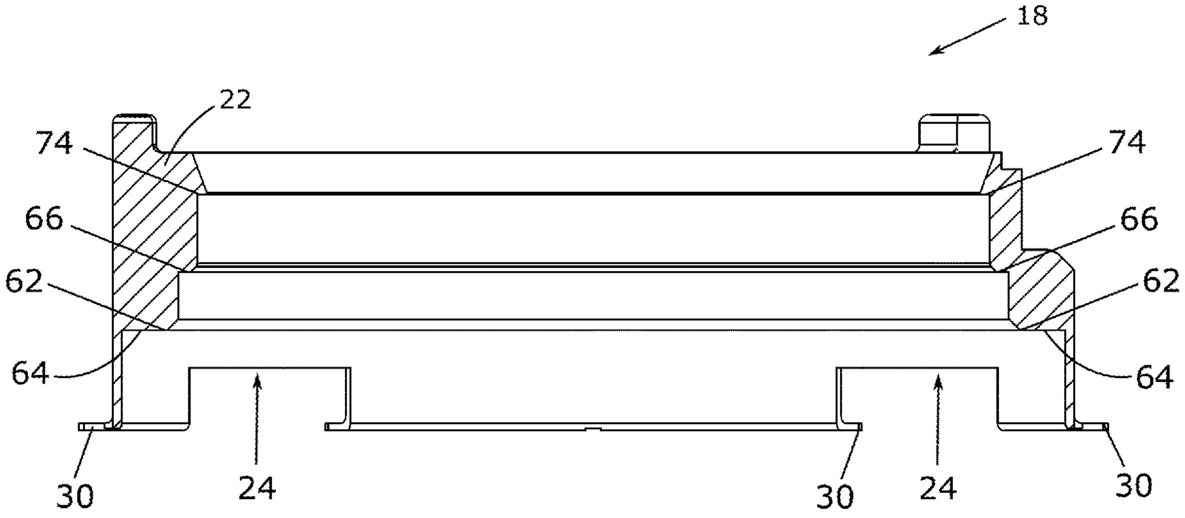
FIG. 14 is a view taken along lines 14-14 of FIG. 13.

Referring to the sectional view of FIG. 14, the interior of the collar 18 comprises a shoulder 62 whose downward facing surface 64 provides a staging surface for fasteners or screws 40 used to rotate and tighten the feet 38. The shoulder 62 comprises bores 42 (shown in FIG. 15) for receiving the fasteners/screws 40. This shoulder 62 also has bores 61 (also shown in FIG. 15) to receive fasteners or screws (105 in FIG. 30) for mounting a trimless mud ring or plate (106 in FIG. 30) to the collar 18.

Figure 5:
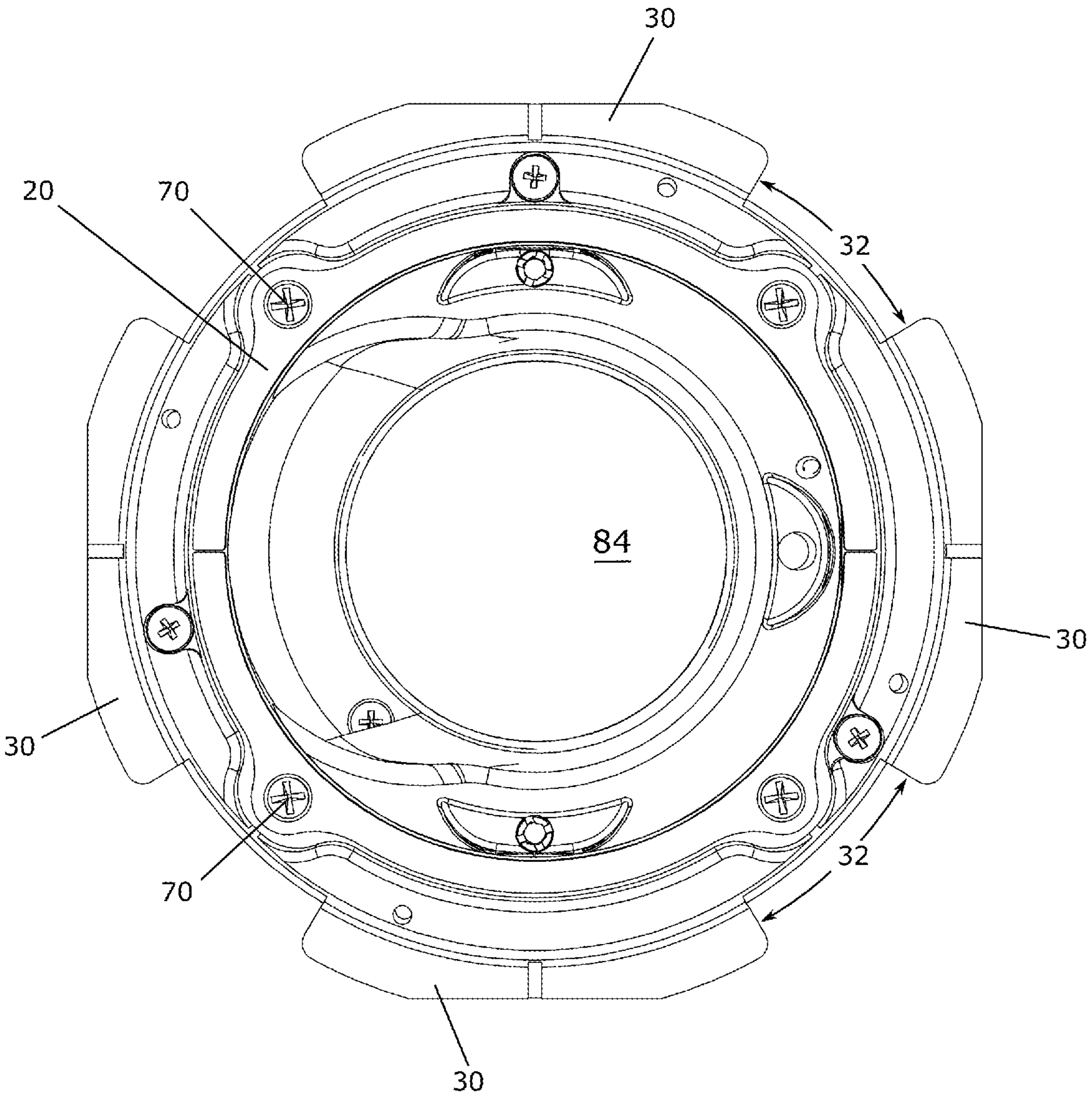
FIG. 5 is a bottom view of the assembly of FIG. 1.

The interior of the collar 18 further comprises a second shoulder or seat 66 inboard the first shoulder 62. The second shoulder 66 is formed against the first shoulder 62 to provide a retaining ring seat for receiving a retaining ring 20. The second shoulder 62 comprises a flat surface that is orthogonal to a longitudinal axis of the sleeve 22 of the collar 18 for seating the ring 20 on the surface. The first, otherwise circular, shoulder 62 includes recesses 68 (shown in FIG. 15) that allow the placement of retaining ring fasteners or screws 70 (shown in FIG. 5). The second shoulder 66 comprises bores 72 at the recesses 68 for receiving the screws 70. The recesses 68 coincide with the cut-outs 24 in the collar 18 to further avoid obstruction when using a trim having square upwardly extending structures.

Referring again to FIG. 14, the interior of the collar 18 further comprises an abutment surface forming an insertion stop 74 at the upper end of the collar 18. The insertion stop 74 consists of an annular lip extending inward from the interior surface of the collar 18.

According to the preferred embodiment, an optics housing 16 comprises a frusto-spherical shell 17 that is coupled to the heat sink 12 and nested within the collar 18. Referring to FIGS. 6-10, the shell 17 is positioned below the heat sink 12 and is preferably vertically spaced from the heat sink 12, particularly if the heat sink and light source are made tiltable in relation to the optics housing. The shell 17 is preferably coupled to two opposing sides of the heat sink 12 by a plate 76 and/or one or more arms 78 (preferably a pair of arms). The shell 17 is truncated at its top adjacent the light source 14. The shell 17 has a bottom opening 78 to allow light to be emitted therethrough.

Figure 4:
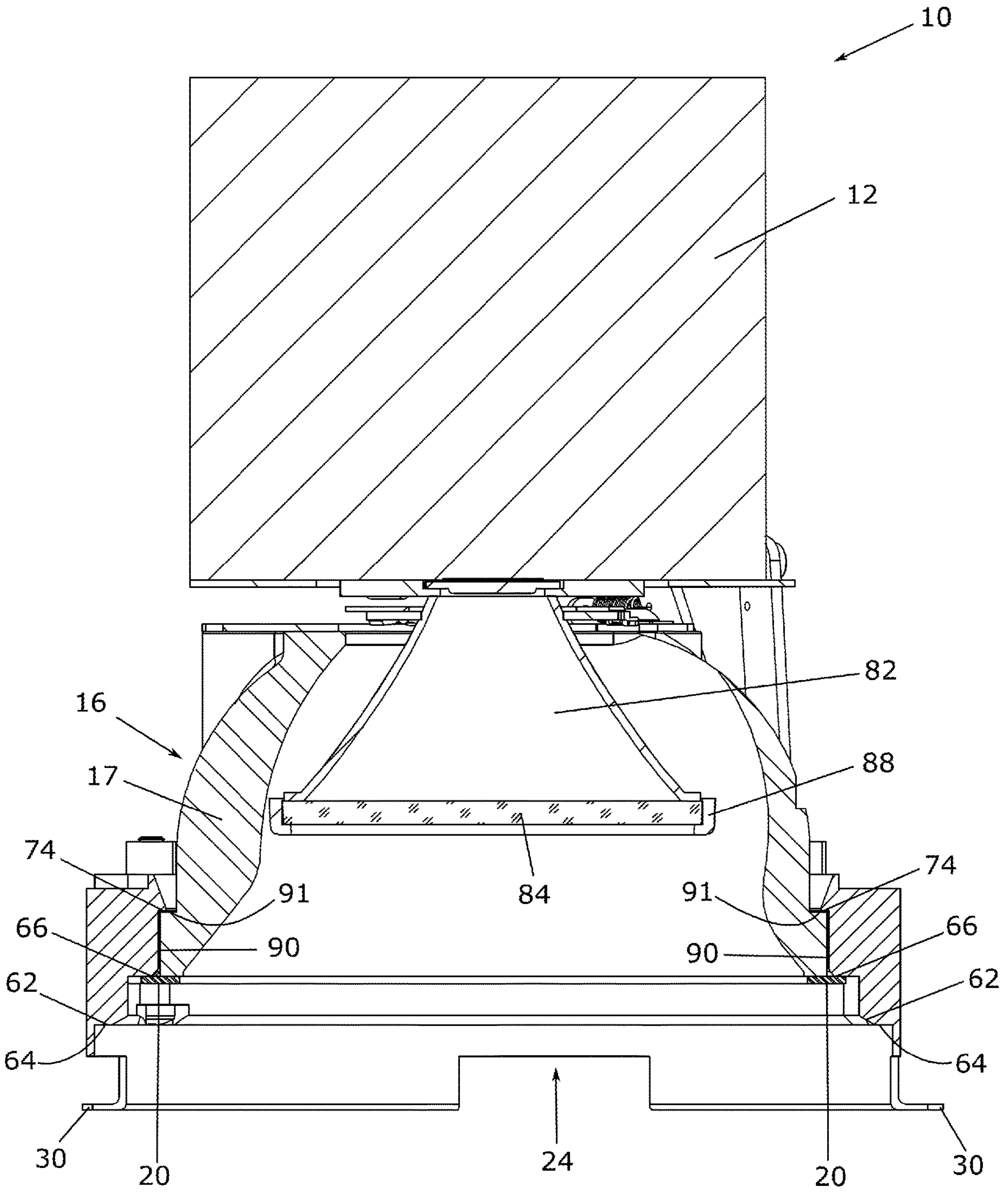
FIG. 4 is a view taken along lines 4-4 of FIG. 3.

Referring to FIG. 2, the optics housing 16 may house one or more optical components such as a conical reflector 82 and/or a lens 84 (see. FIG. 4). The reflector 82 may be releasably coupled to the bottom of the heat sink 12 via a mounting plate 86. In an alternative embodiment (not shown), the reflector 82 may be coupled to the optics housing 16. The reflector 82 may further comprise an accessory holder 88 for retaining one or more lenses 84 to focus or diffuse light. The accessory holder 88 may fit over the reflector 76 via a snap-fit connection.

Referring to FIG. 4, the optics housing 16 nests within the collar 18 which is fitted about an opening in the ceiling. The shell 17 further comprises a bottom rim 90 whose upper edge forms an abutment surface 91 for abutting against an insertion stop 74 of the collar 18. The insertion stop 74 is preferably a circumferential protrusion extending inward (generally perpendicular) from the inner surface of the collar 18. The insertion stop 74 allows the optics housing 16 to be seated in the collar 18 and prevents the optics housing 16 from being inserted any further into the collar 18.

Referring to FIG. 4, the rim 90 has a vertical extent selected to match the vertical extent between the insertion stop 74 and the retaining ring seat 66. Once the optics housing 16 is seated in the collar 18, a retaining ring 20 may be secured (by screws 70 shown in FIG. 5) inside the collar 18 against the bottom of the optics housing 16 so as to sandwich the rim 90.

Figure 20:
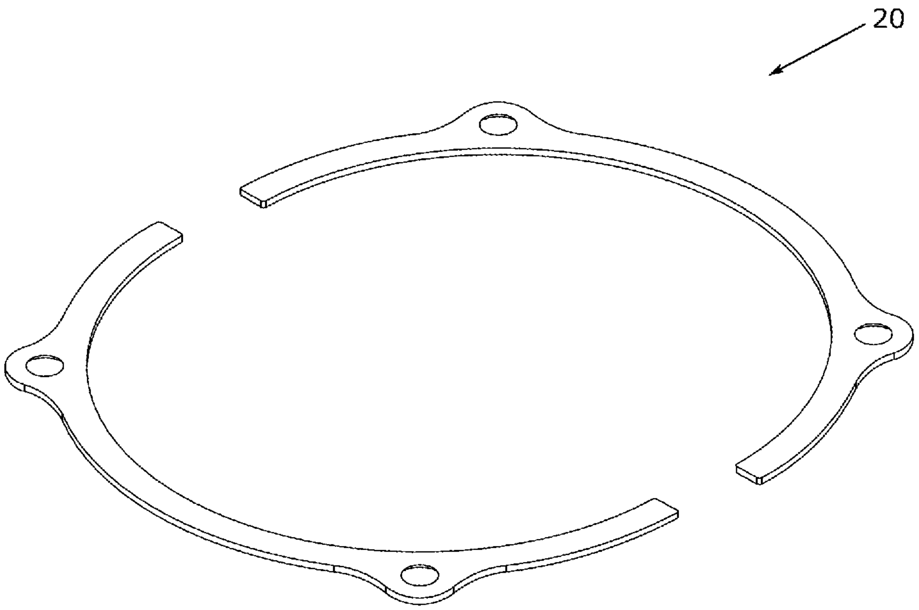
FIG. 20 is a perspective view of the composite retaining ring according to the preferred embodiment.

The retaining ring 20 according to the invention is a composite ring preferably comprising two semi-circular parts that together define the full ring (shown in FIG. 20). In another embodiment, the retaining ring 20 may comprise more than two parts that together define the full ring. The multi-component feature of the ring 20 allows the ring to be disassembled within the collar and each part to be withdrawn through the ceiling opening, even in the presence of mudded-in square mud plate.

Figure 6B:
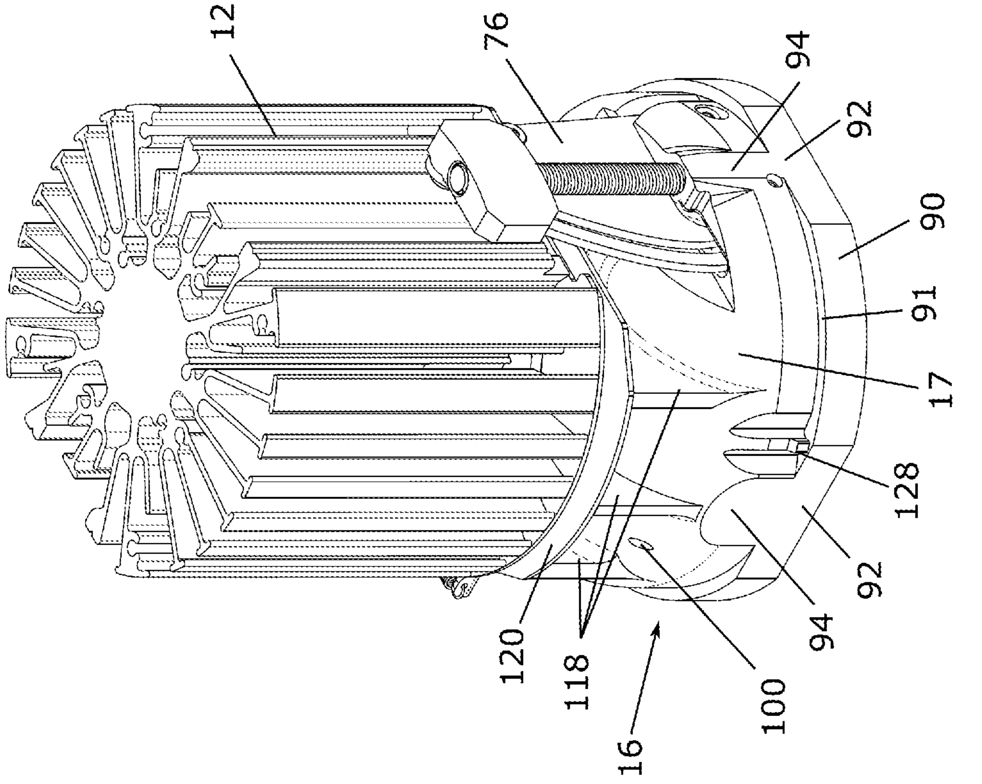
FIGS. 6A & B are perspective views of the heat sink and light source and optics housing according to the preferred embodiment.
Figure 6A:
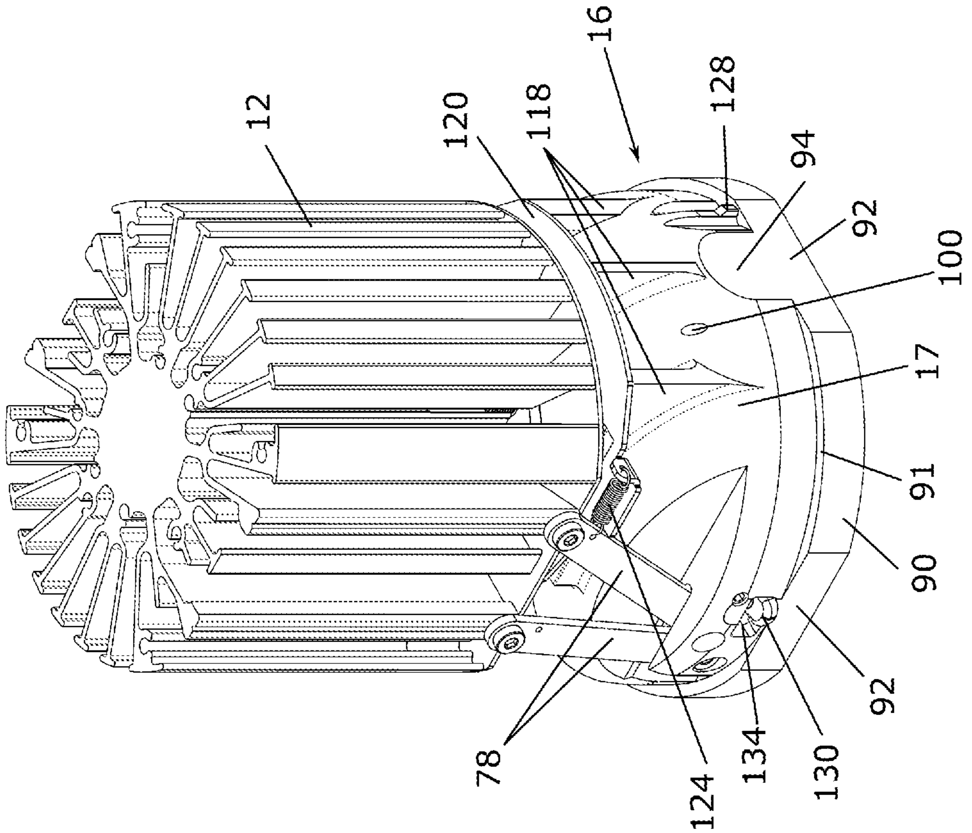
Figure 8:
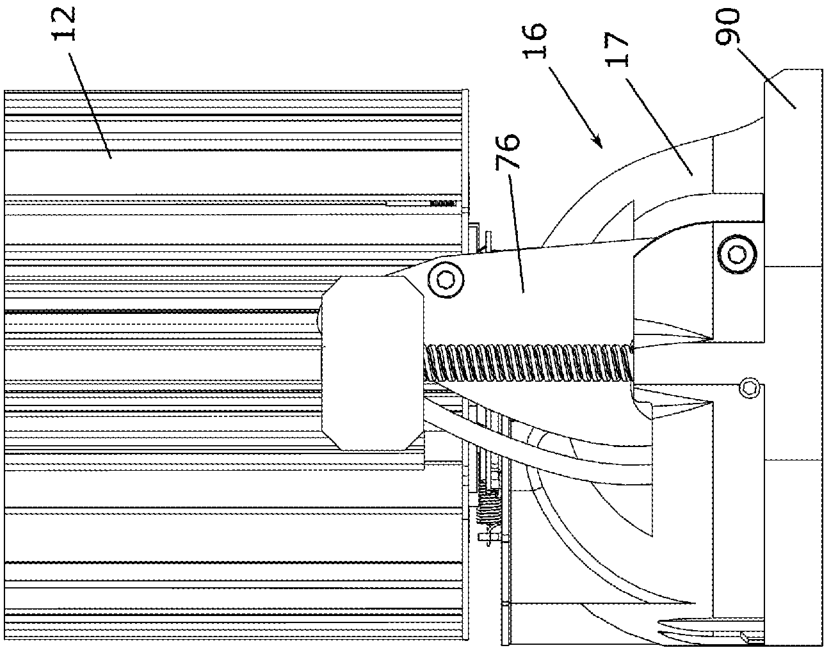
FIGS. 7, 8, 9 and 10 are right side, left side, rear and front views of the heat sink and light source and optics housing according to the preferred embodiment.
Figure 7:
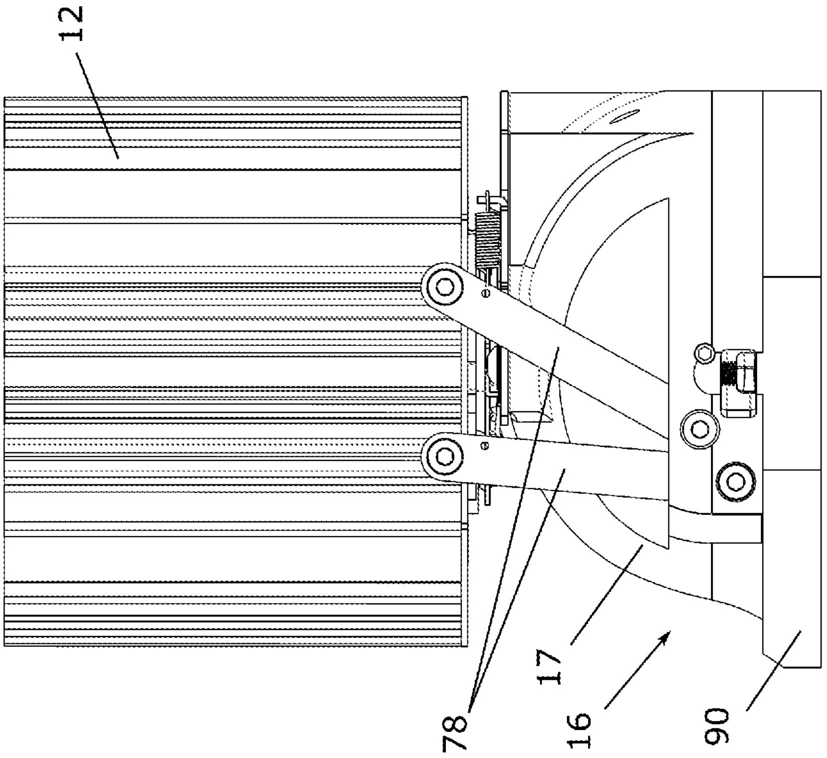
Figure 10:
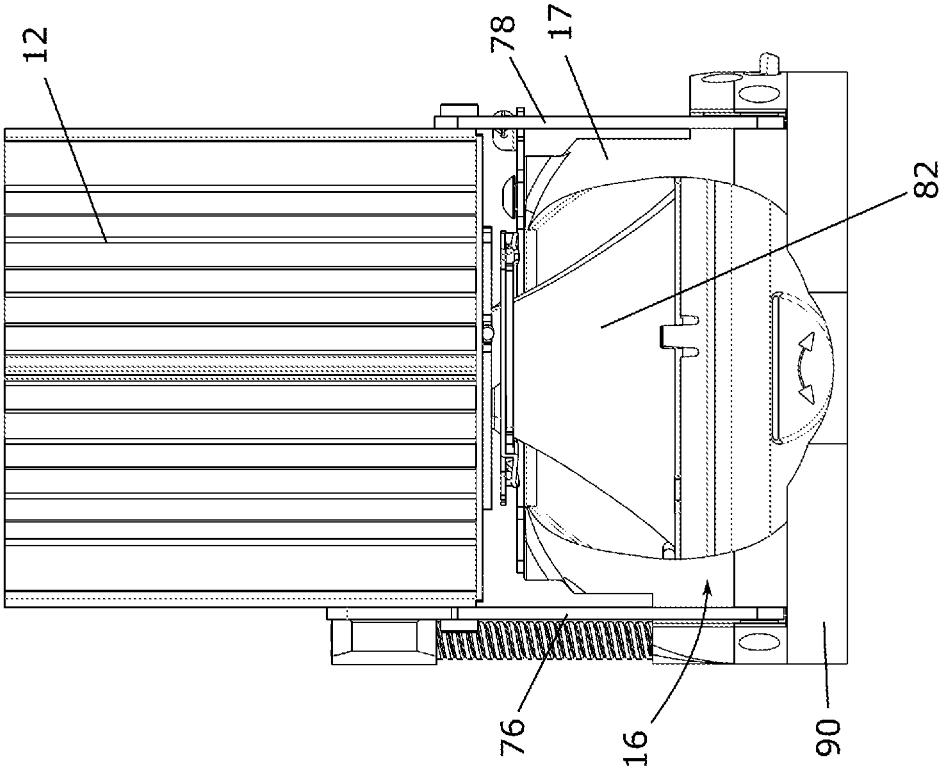
Figure 9:
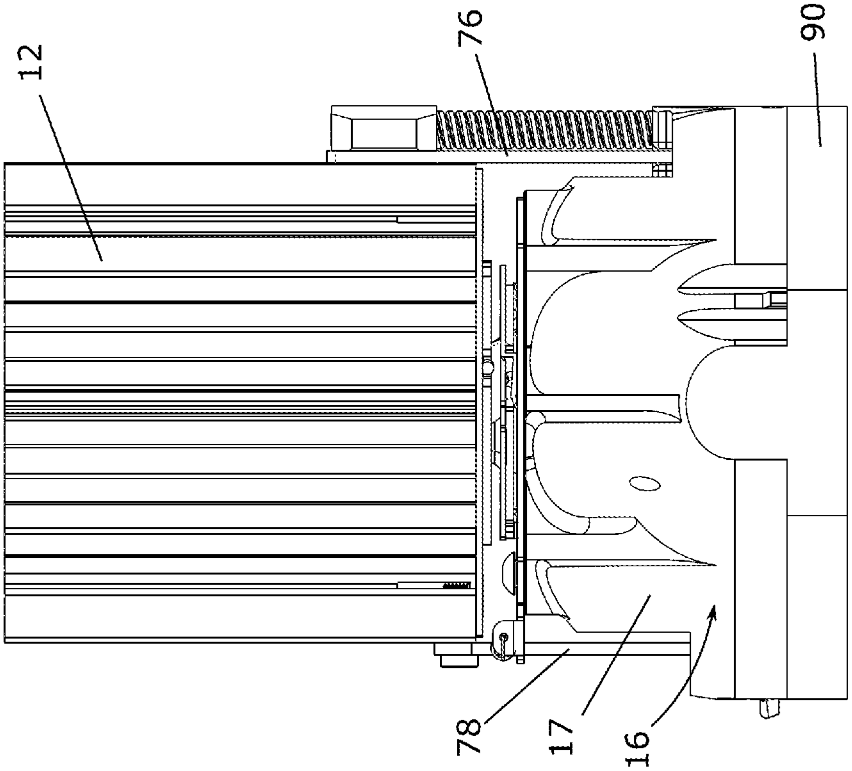
Figure 11:
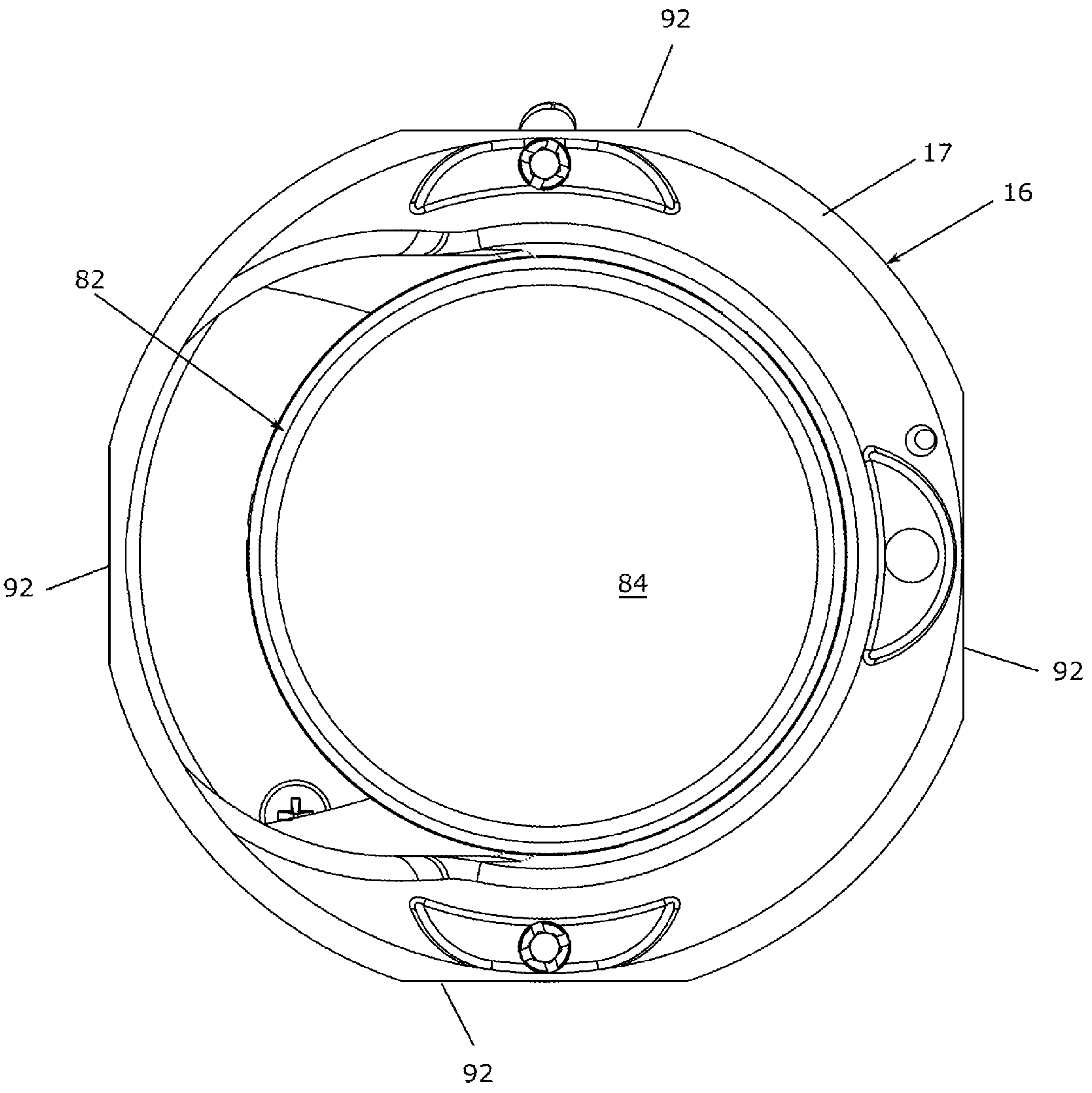
FIG. 11 is a bottom view of the optics housing.
Figure 12A:
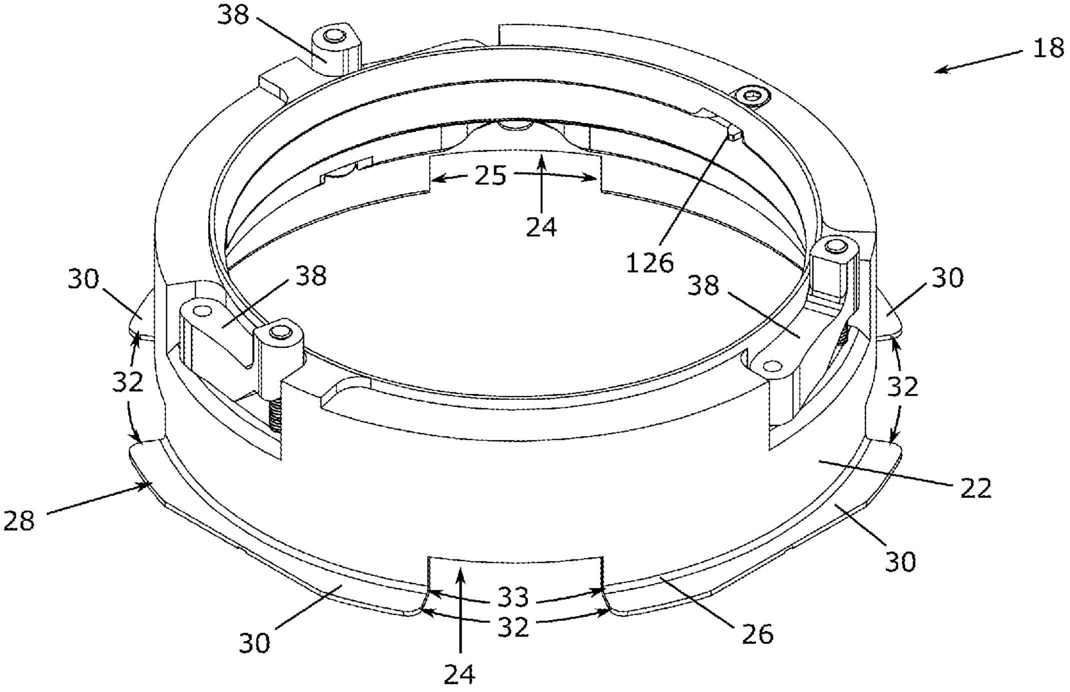
FIGS. 12A & B are perspective views of the collar according to the preferred embodiment.
Figure 12B:
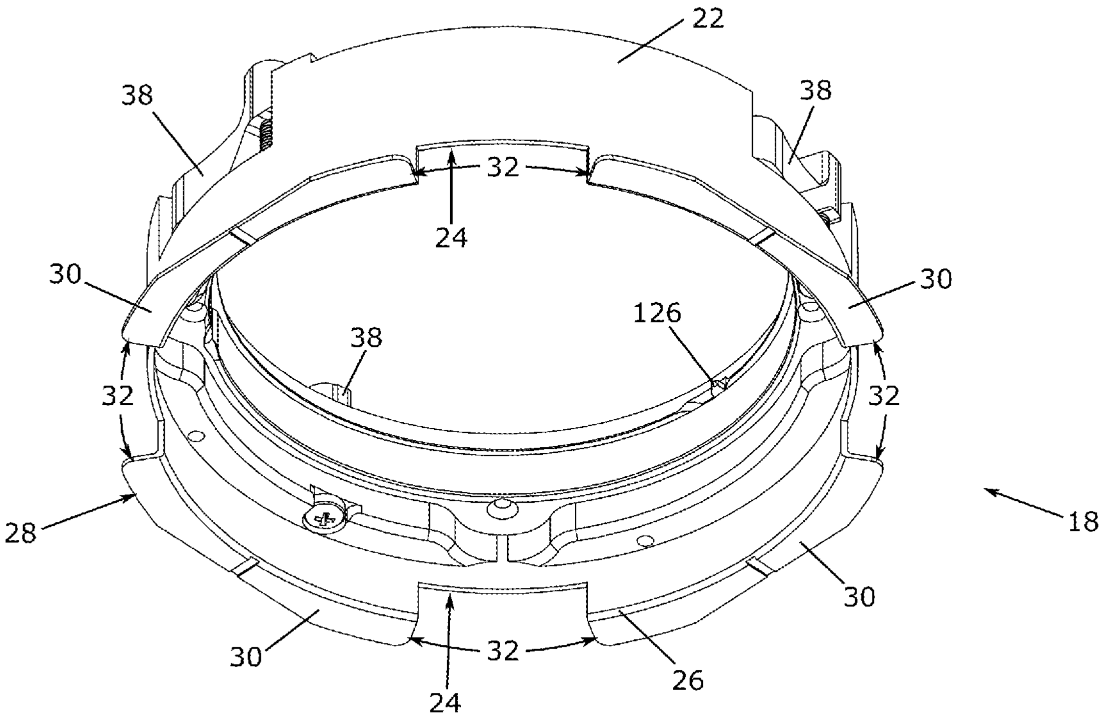
Figure 13:
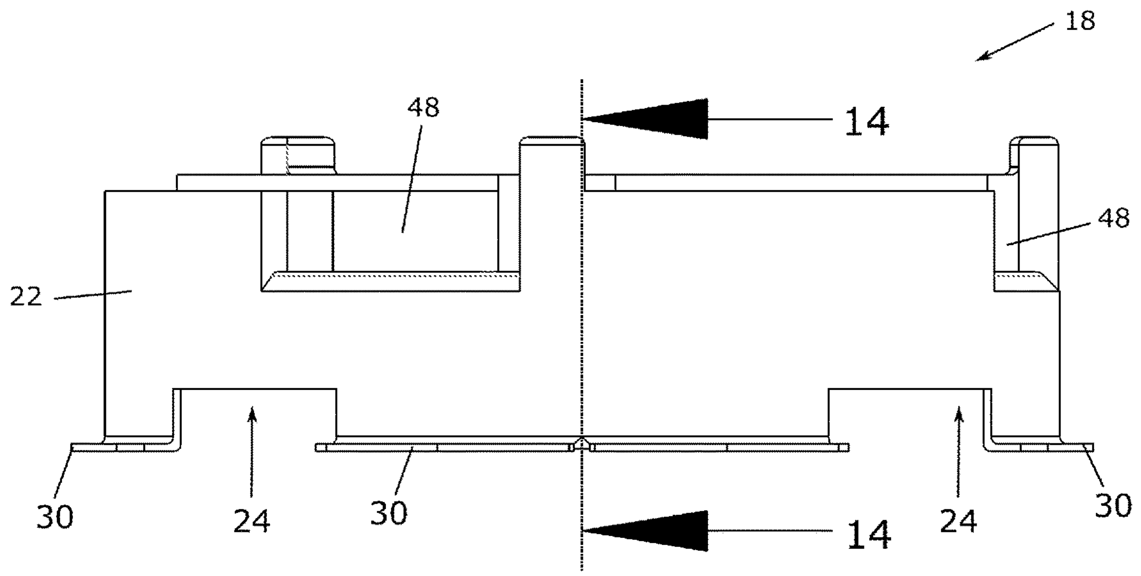
FIG. 13 is a side view of the collar (without the feet)
Figure 38:
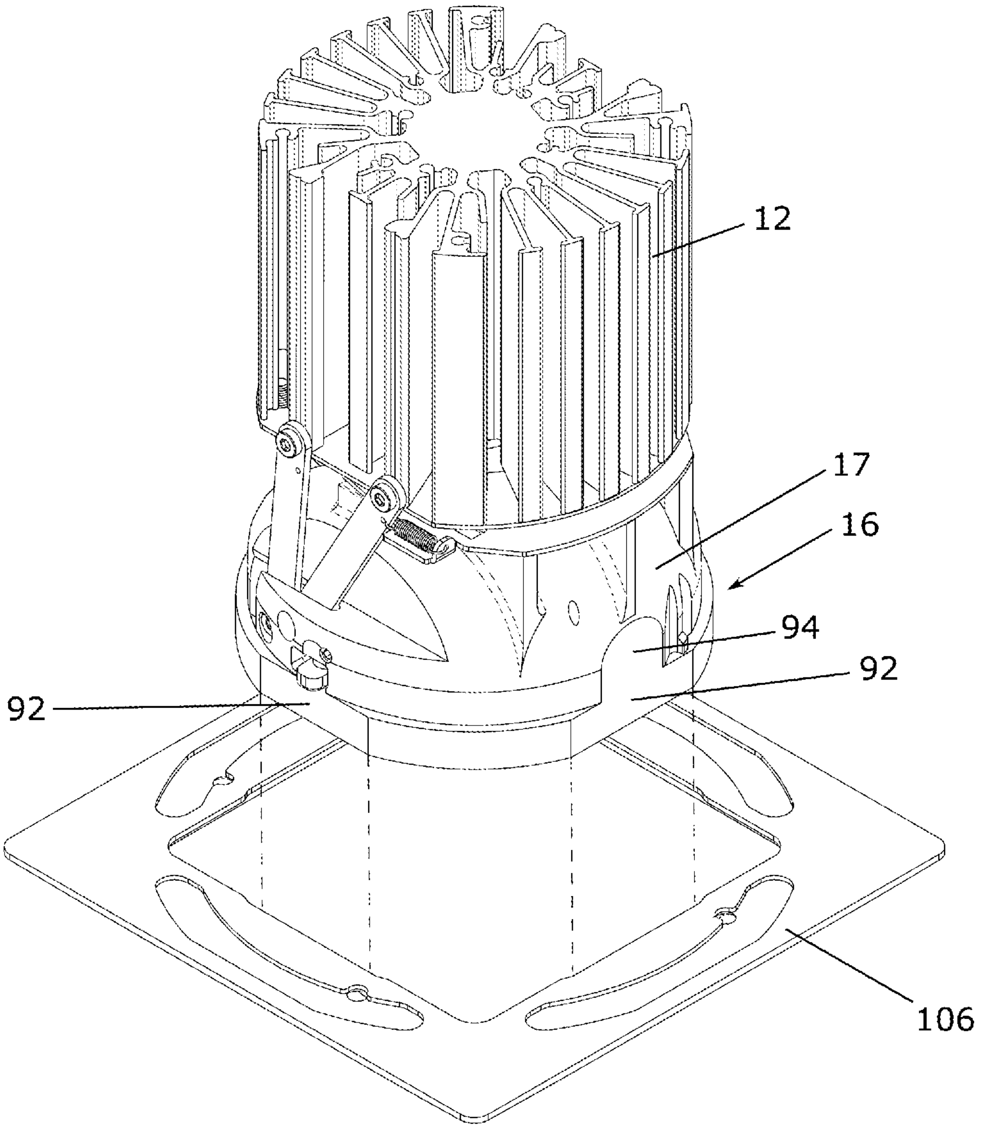
FIG. 38 is a perspective view of the optics housing (and the heat sink coupled to it) with the square mud plate below it.
Figure 38A:
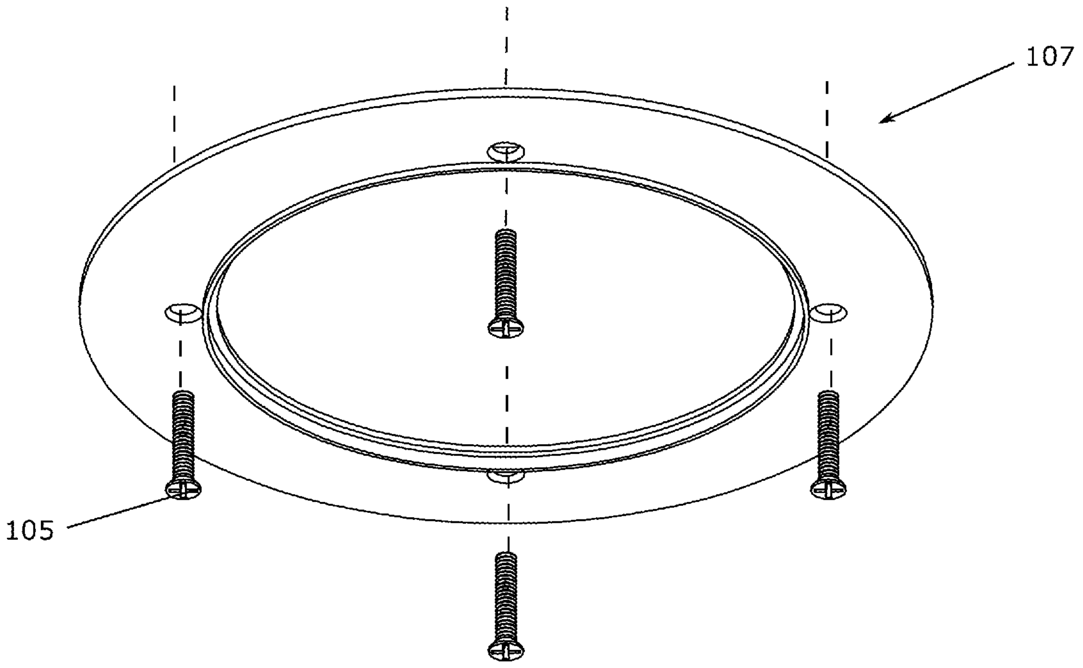
FIGS. 38A & B are perspective views of a round/circular mud ring/plate.
Figure 38B:
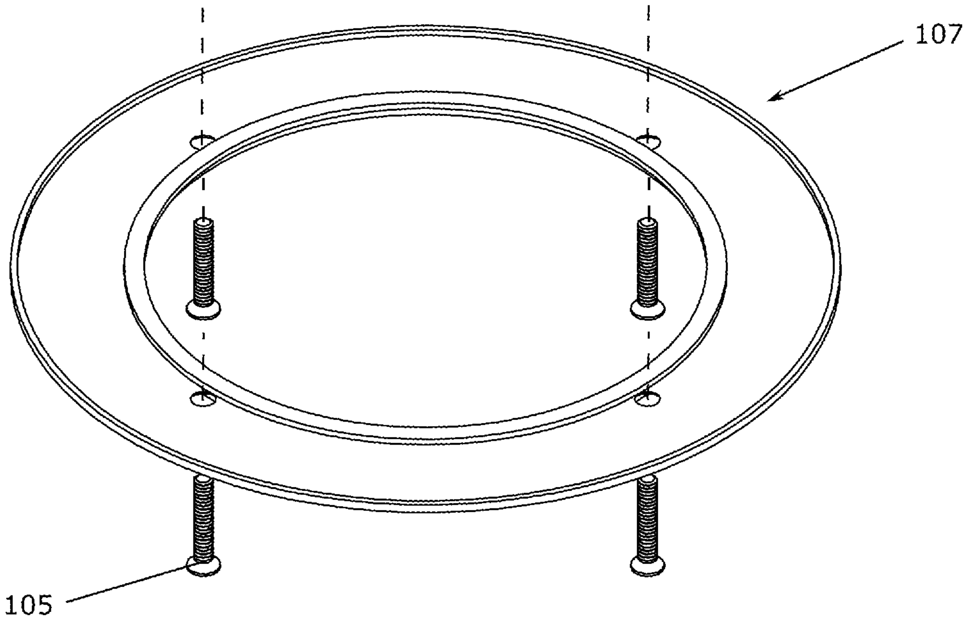
FIG. 38C is a perspective view of the optics housing (and the heat sink coupled to it) with the round/circular mud ring/plate below it.
Figure 38C:
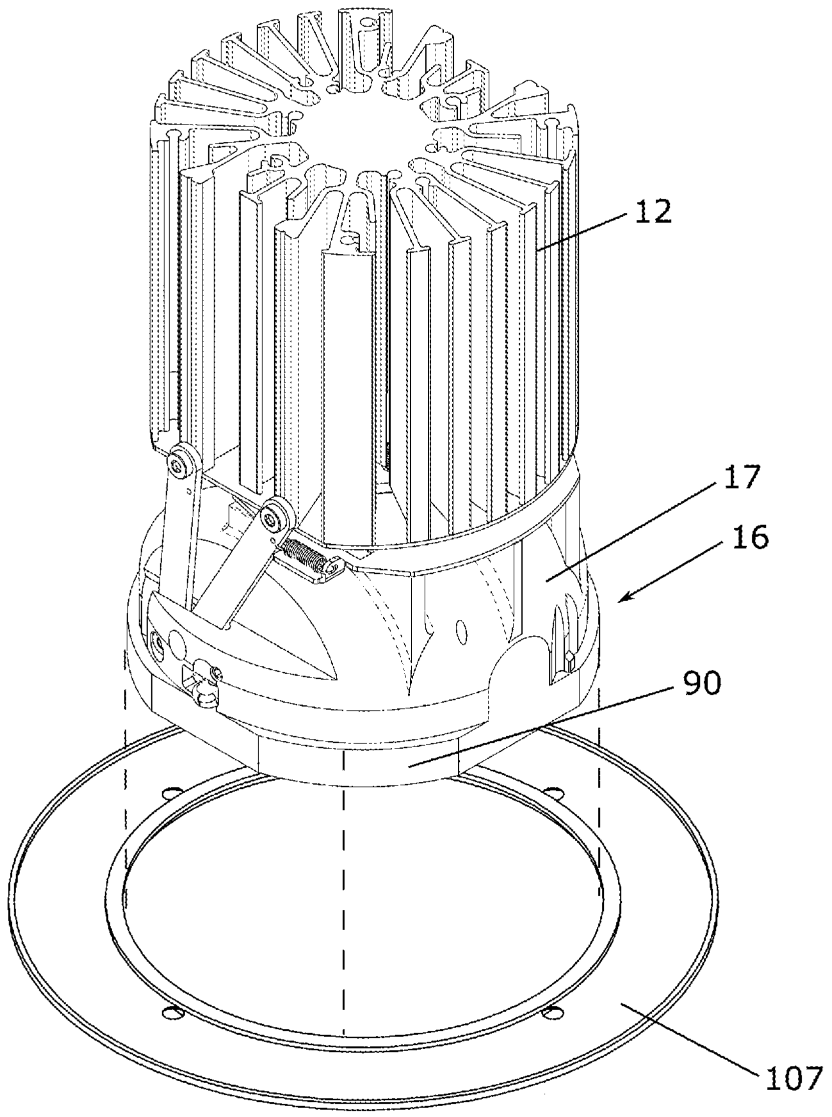
Figure 39:
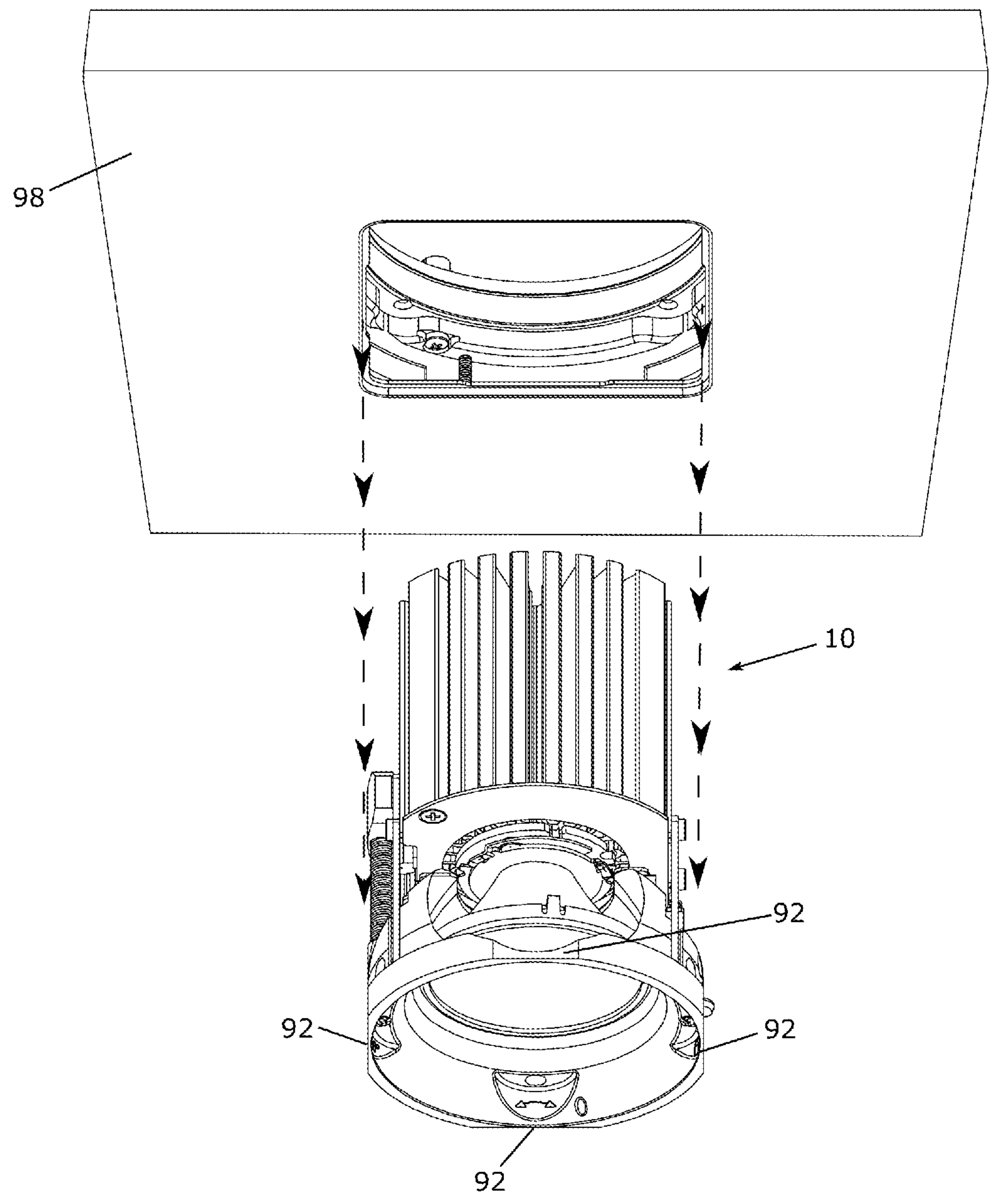
FIG. 39 is a perspective view of the optics housing (and the heat sink and other components coupled to it) being removed from the ceiling opening.

Referring to FIGS. 6 and 11, the rim 90 further comprises four flattened sides 92 equally disposed around the rim 90. The shell 17 may also include one or more flattened sides 94 corresponding to and parallel to the ones on the rim 90. The flattened rim surfaces 92 and flattened shell surfaces 94 (see also FIG. 38) allow the optics housing 16 (and the components attached to it) to be withdrawn through a ceiling opening with a mudded-in square mud plate of similar or larger dimensions. The frusto-spherical shell 17 is dimensioned to allow the shell 17 to pass through a round mud plate 107 having a round annulus (see. FIGS. 38A, B & C), and the flattened shell surfaces 94 and flattened rim surfaces 92 are dimensioned to allow the optics housing 16 to pass through a square mud plate 106 having a square annulus.

The features of the invention allow one to pre-install an empty ceiling housing and to select and install a downlight after the ceiling is finished. A driver compatible with the selected light engine is inserted into the housing through the ceiling opening and is connected to the electrical wiring. Referring to FIG. 4, the optics housing 16 (and the components attached to it) can then be inserted into the collar 18 such that the rim 90 of the shell 17 biases against the insertion stop 74 of the collar 18. The retaining ring 20 is then inserted and secured in the collar against the bottom of the shell 17 by screws 70 such that the rim 90 of the shell 17 is held in between the insertion stop 74 and the retaining ring 20.

In the case of a trimless ceiling, the collar and the mud plates are preferably installed before the ceiling is finished. The inventive features allow the later selection of a lighting system and a suitable driver and square or round trim.

For a non-trimless look where trim will be visible, the collar according to the invention can be installed after the ceiling is finished and an optics housing along with round or square trim can be selected later. Suitably coordinated round or square trim will act to hide the collar flange structure of the preferred embodiment.

Alternatively, the entire assembly 10 can be assembled as a unit including the collar 18, the optics housing 16 and the retaining ring 20, and the entire assembly can be attached to a suitable driver and be introduced into the ceiling opening.

Figure 21:
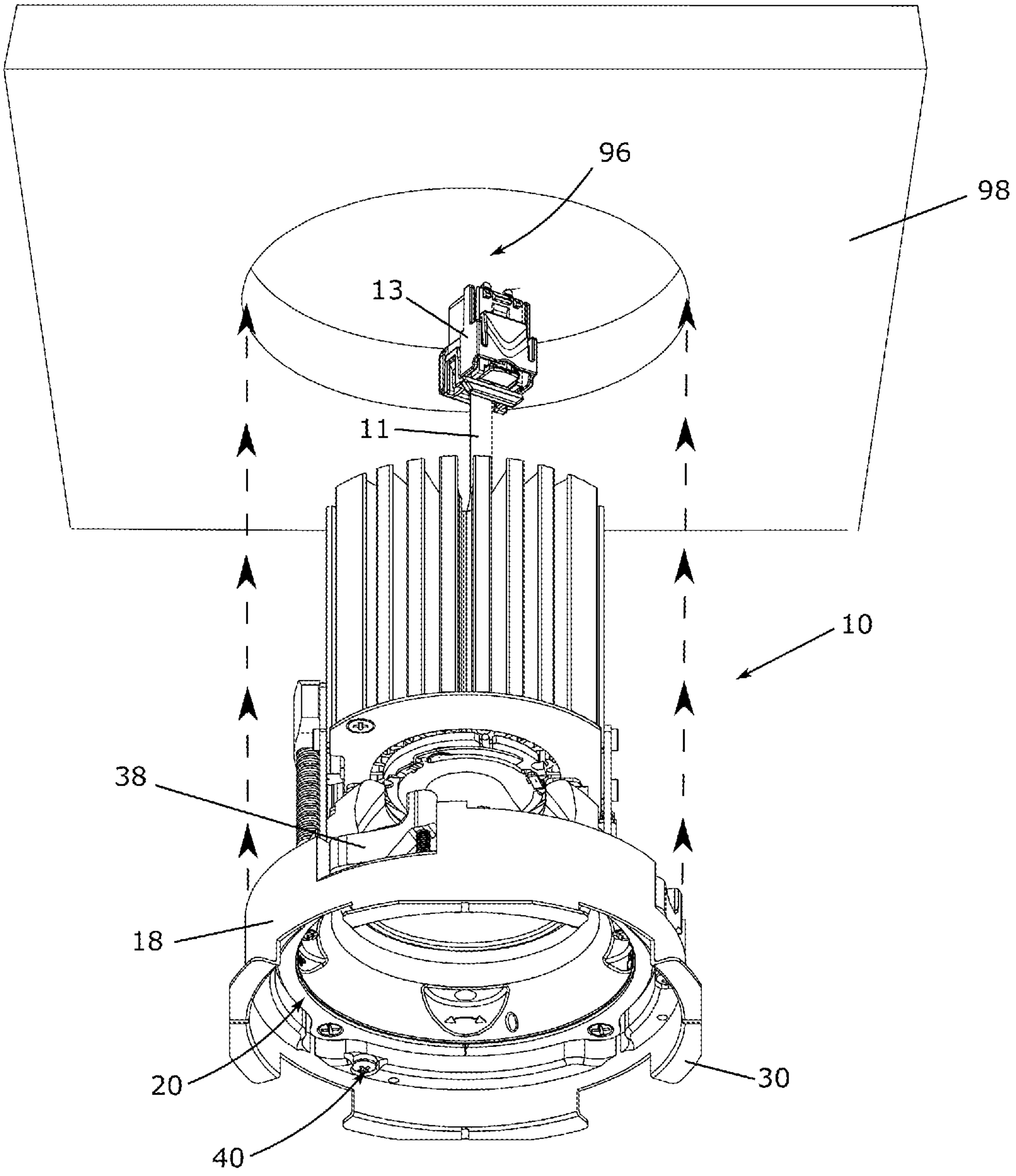
FIG. 21 is a bottom perspective view of the collar and optics housing assembly (with wiring and a connector for connecting to a driver) being inserted into an opening in the ceiling.

FIGS. 21 & 22 show installation of a pre-assembled assembly into an opening 96 in the ceiling 98. The opening 96 is pre-cut to the dimensions of the collar 18. The assembly 10 along with wiring 11 and a connector 13 for connecting to a driver (not shown) are inserted into the opening from below. That is done while the feet 38 are disengaged and housed within the recesses 48 of the collar 18 so that they do not interfere when the collar 18 (and assembly 10) is being inserted into the opening.

Figure 22A:
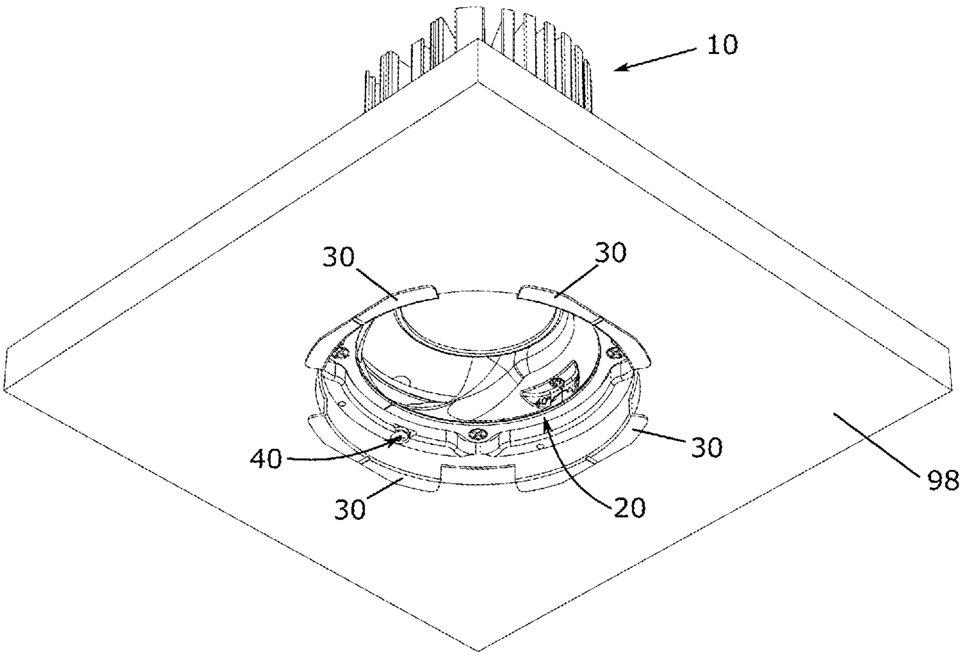
FIGS. 22A & B are perspective views of the assembly of FIG. 21 installed in the ceiling.
Figure 22B:
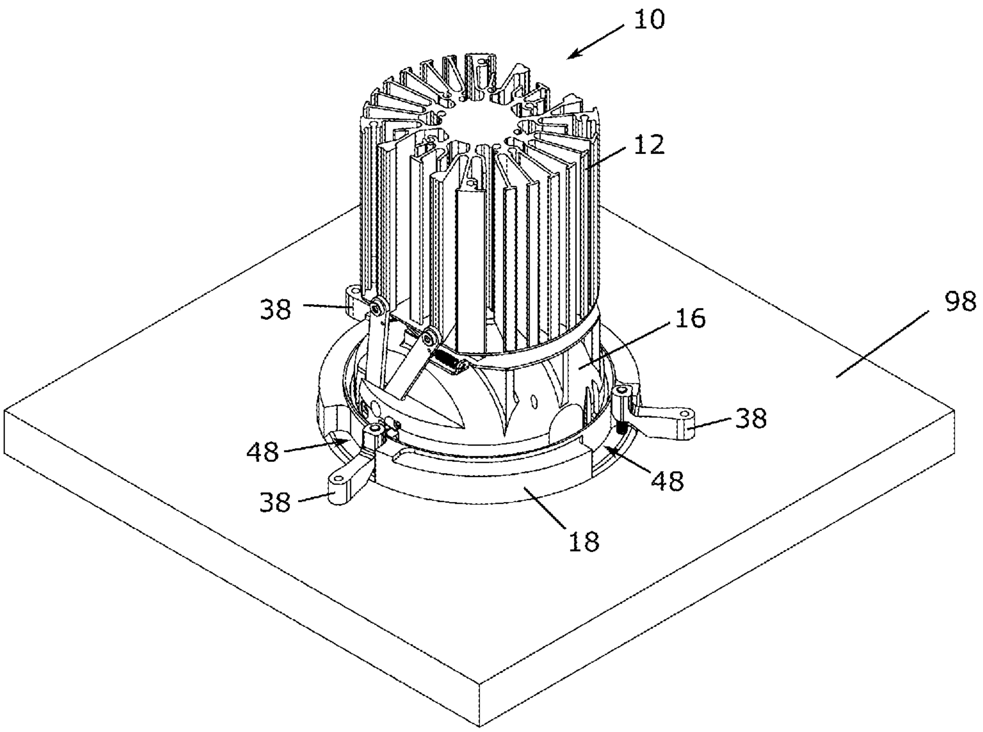

As seen in FIG. 22A, once the driver (not shown) is connected to the household wiring inside the ceiling housing and the assembly 10 is inserted into the opening 96 and connected to the driver by the wiring 11 and connector 13, the flange elements 30 of the collar 18 abut the underside of the ceiling. The installer then inserts a compatible screwdriver or other tool into the collar 18 from below to turn screws 40 connected to the feet 38 which are now on the other side of the ceiling 92. Referring to FIG. 22B, this deploys the feet 38 out of the recesses 48 to engage the top surface of the ceiling. As the screws 40 further tighten the feet 38, the feet 38 clamp the ceiling between the feet 38 (on the top surface of the ceiling) and the flange elements 30 (on the underside of the ceiling), thus securing the assembly 10 in the ceiling opening 96.

Trim generally comes with either a round flange 94 or a square flange 96. They may include a secondary reflector 58 as a structure extending upward from the flange and into the collar. The retaining ring 20 is metallic to releasably couple with magnets 98 on the trim.

Referring to FIGS. 23-29, once the assembly 10 is secured in the ceiling opening, a trim 54, 56 may be coupled to the underside of the ceiling 92 around the opening to cover the flange elements 30 of the collar 18 and provide a finished appearance to the lighting assembly.

Figure 23B:
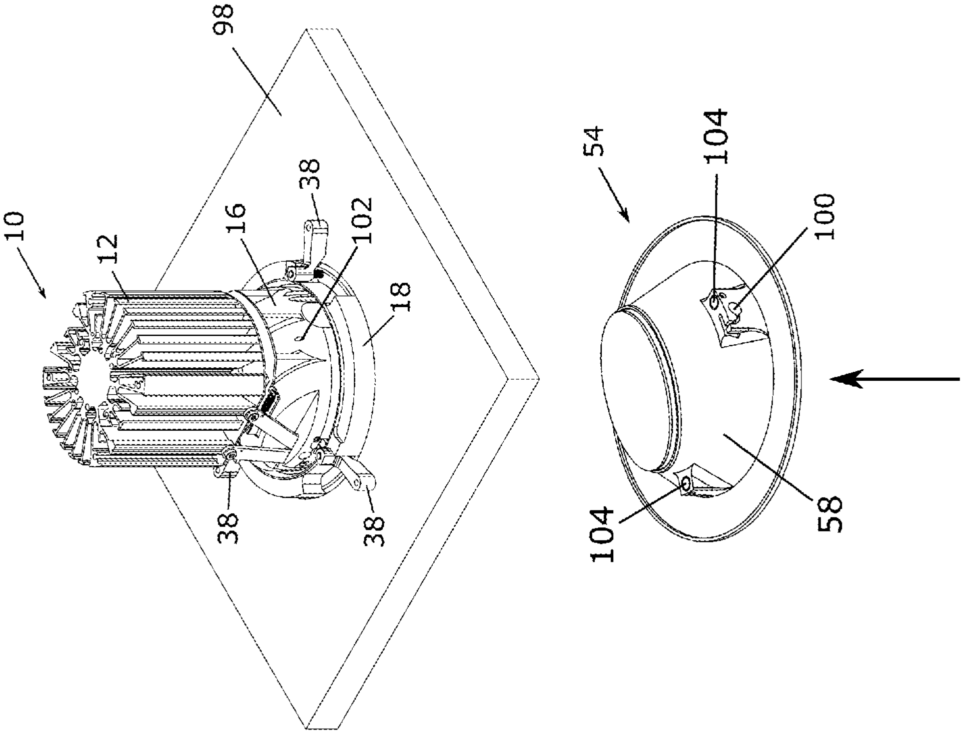
FIGS. 23A & B are perspective views of a round trim being attached to the assembly in the ceiling.
Figure 23A:
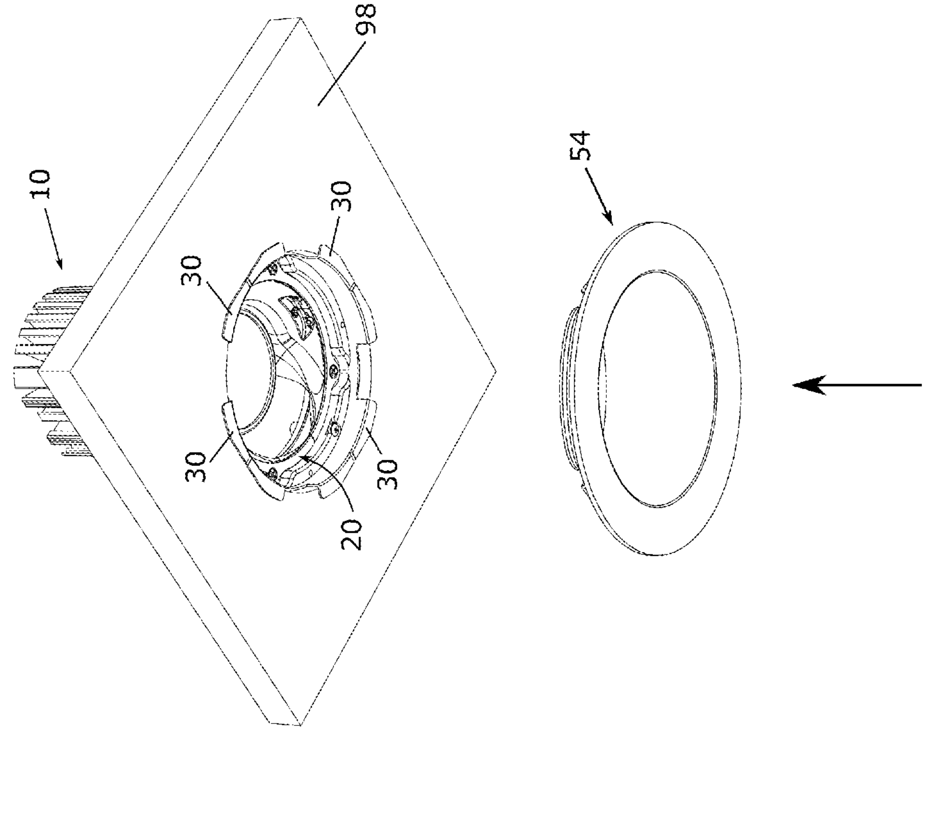
Figure 24:
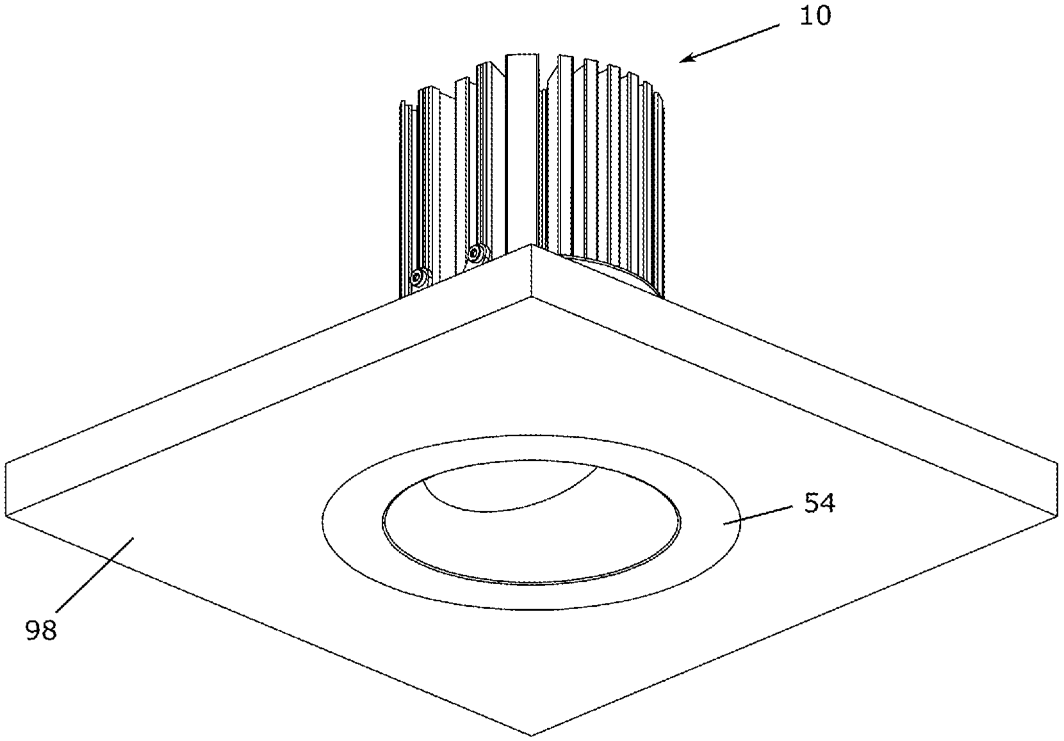
FIG. 24 is a bottom perspective view of the assembly installed in the ceiling with a round trim attached.

FIGS. 23-24 shows a round trim 54 coupled to the assembly 10 and covering flange elements 30 of the trim.

Referring to FIGS. 26-29, when a square trim 56 of the same aspect ratio as the round trim 54 is coupled to the assembly 10, each of the four corner shoulders 60 of the angled wall of the secondary reflector 58 coincide with a cut-out 24 in the cylindrical sleeve 22 of the collar 18. The cut-outs 24 allow for the corner shoulders 60 of the angled wall to sit close to the edge of the ceiling opening 96. Further, the straight edges 34 of the flange elements 30 of the collar 18 coincide with the outer perimeter of the flange 57 of the square trim 56 such that the flange structure 28 (i.e. flange elements 30) of the collar 18 does not extend outside the footprint of the square trim 56. The cut-outs 24 in conjunction with the gaps 32 minimize the visibility of the flange structure 28 (i.e. flange elements 30) at the corners 60 of the square trim 56 when seen from below.

Both the round and square trims 54, 56 may comprise an aperture 100 on the upwardly extending/secondary reflector portion 58 for one end of a wire or cable (not shown) to be threaded through. The other end of the wire or cable may be threaded through a through-hole 102 of the shell 17. When one disengages the magnets 104 of the trim 54, 56 from the retaining ring 20 (for instance, to access the optics housing 16 to adjust the tilt or rotation of the assembly), the trim may hang from the ceiling as adjustments are being made.

In a trimless installation, mud plates are used to hide the flange structure of any collar used in the ceiling opening. Accordingly, in a trimless installation, the collar and mud plates are installed prior to finishing the ceiling.

Figure 33A:
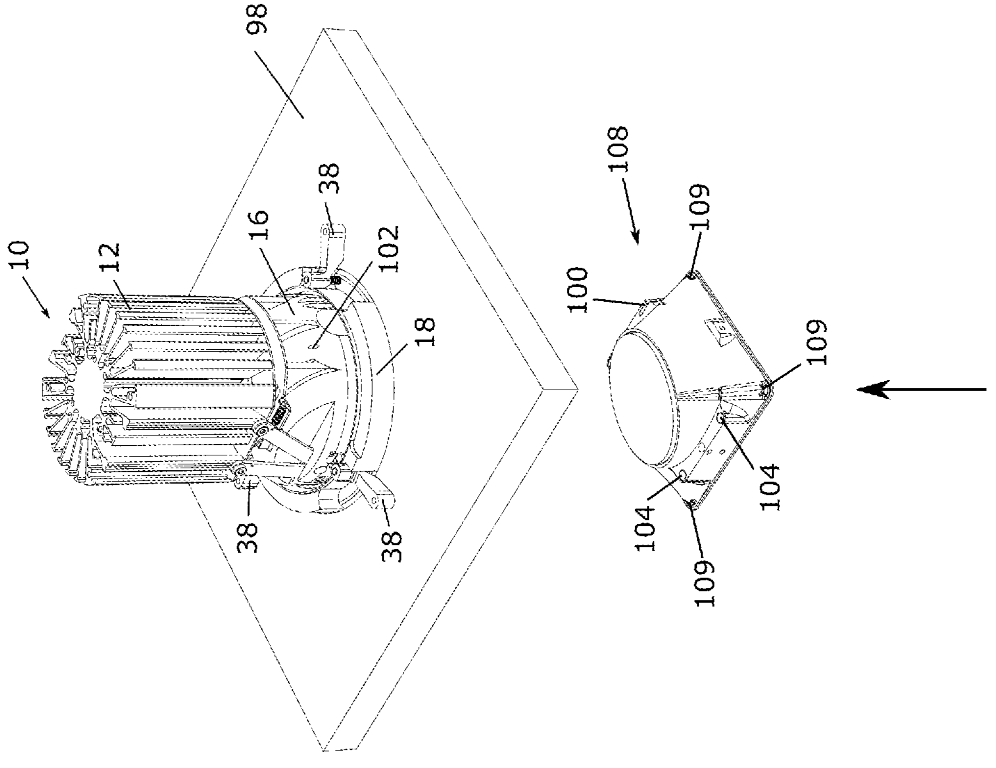
FIGS. 33A & B are perspective views of a secondary reflector being inserted into the light assembly in the ceiling (after the square mud plate is mudded in)
Figure 33B:
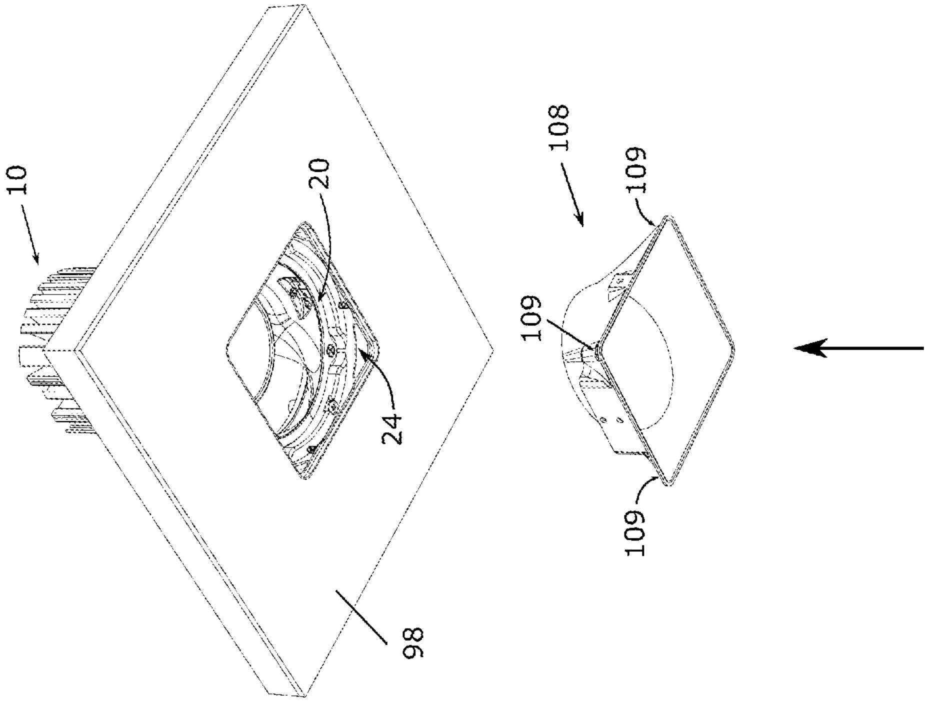
Figure 34:
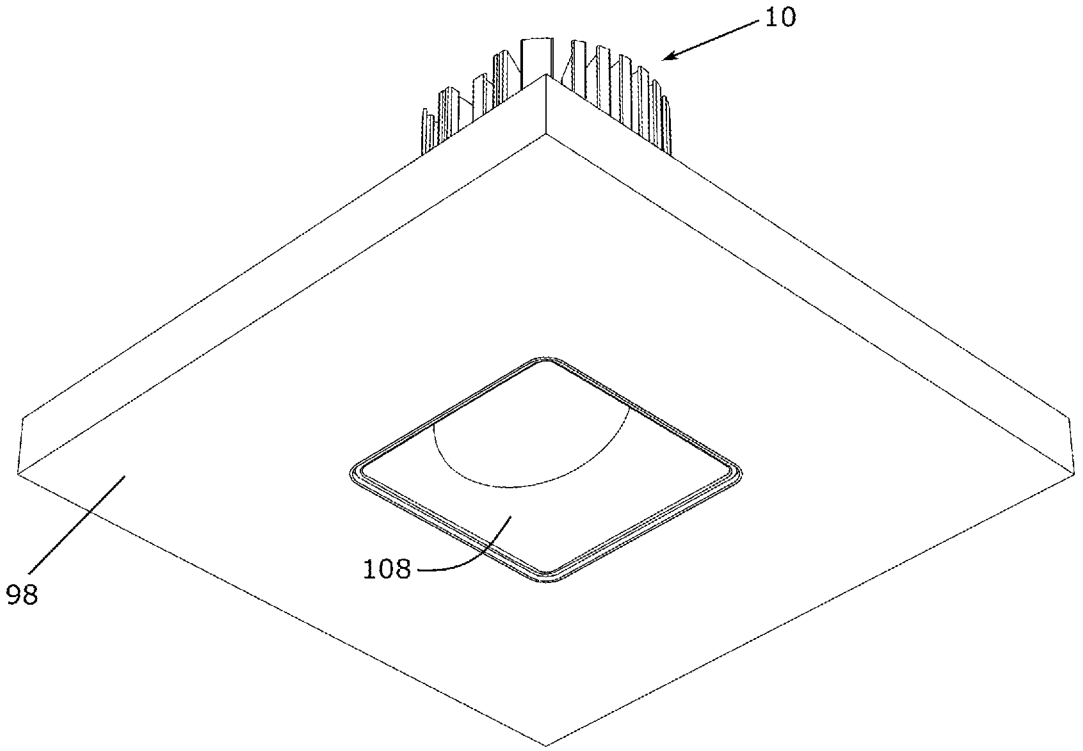
FIG. 34 is a bottom perspective view of the assembly with a mudded-in square mud plate and secondary reflector installed.

Referring to FIGS. 30-34, a square mud plate 106 of the same aspect ratio may be placed about the ceiling opening and against the flange elements 30 of the collar 18 and later mudded into the ceiling for a trimless appearance. Referring to FIG. 33, a secondary reflector 108, similar to that of the upward extending structure/secondary reflector 58 of the square trim 56, may be inserted into the ceiling opening and magnetically couple to the retaining ring 20 (via magnets 104 on the secondary reflector 108). As with the secondary reflector 58 of the square trim 56, the corners 109 of the secondary reflector 108 in a square mud plate installation will coincide with and be seated within the cut-outs 24 of the collar 18.

In a trimless installation, use of the versatile collar according to the invention gives the installer the option of installing the entire assembly before the ceiling is finished, or only installing the collar 18, leaving the selection and installation of a driver, optics housing, optics and trim to a later date after the ceiling is finished. The invention also allows the optics to be removed from even a trimless installation with mud plates.

Figure 35:
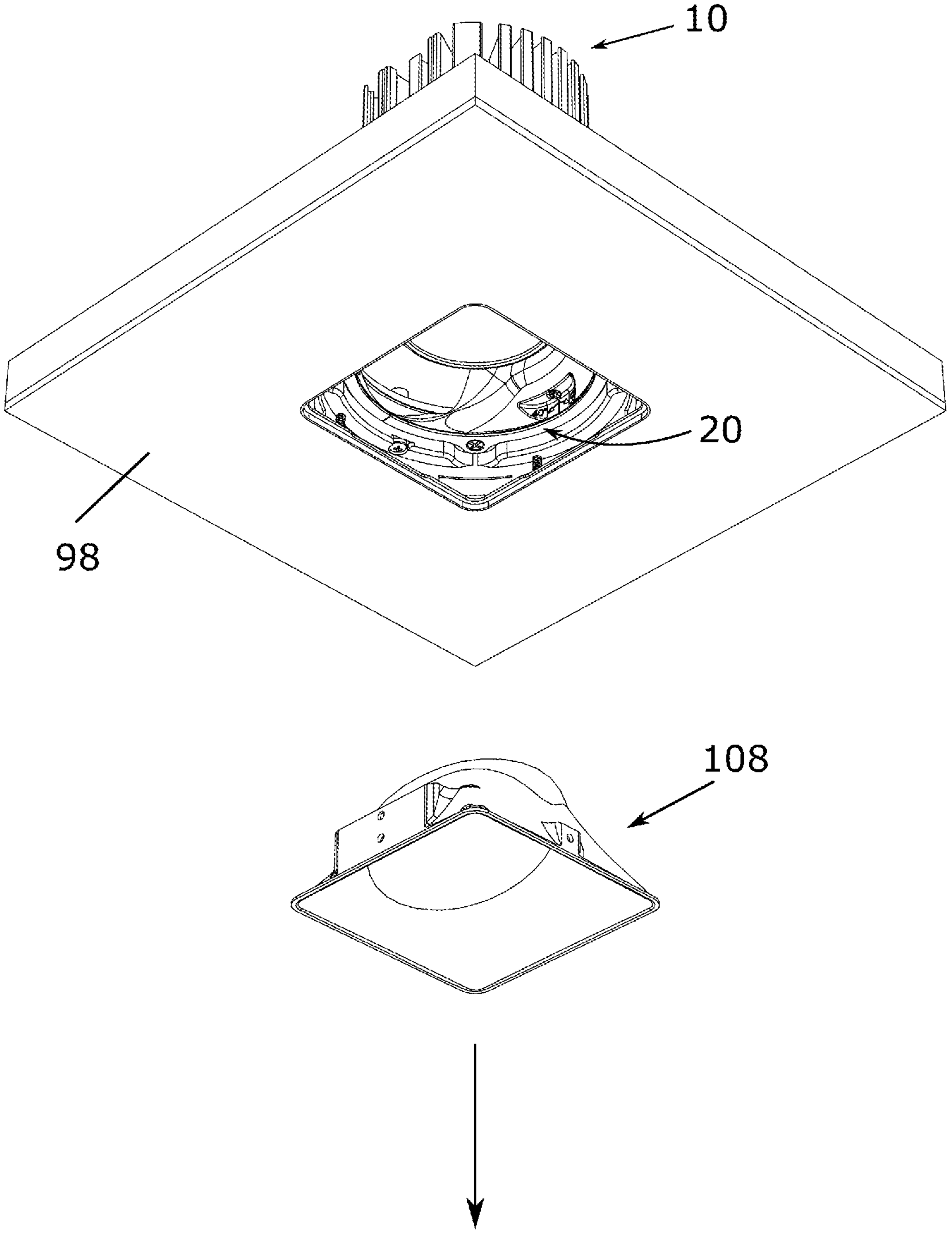
FIG. 35 is a perspective of the secondary reflector being removed from the assembly in the ceiling.
Figure 36:
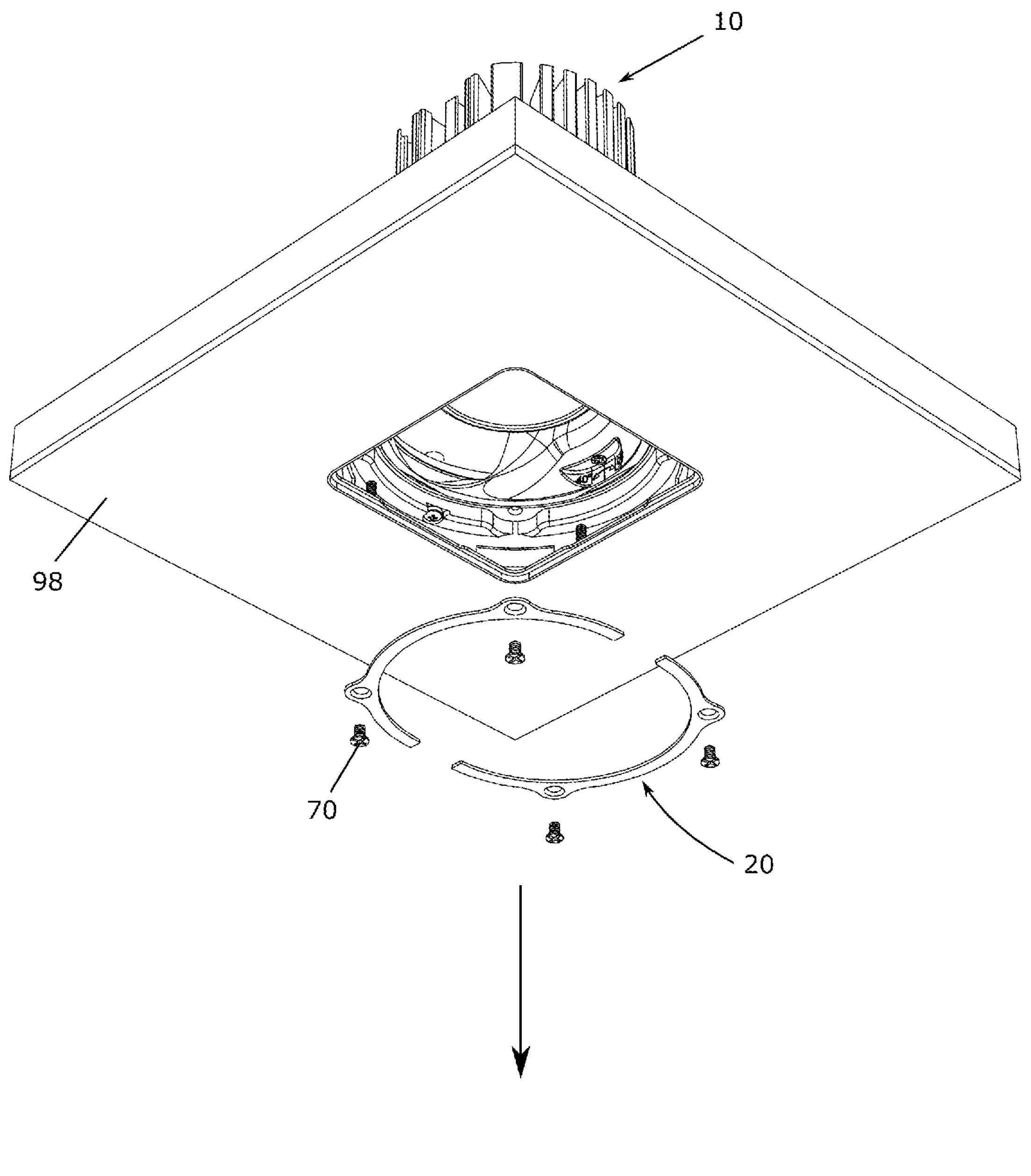
FIG. 36 is a perspective of the retaining ring being removed from the assembly in the ceiling.
Figure 37:
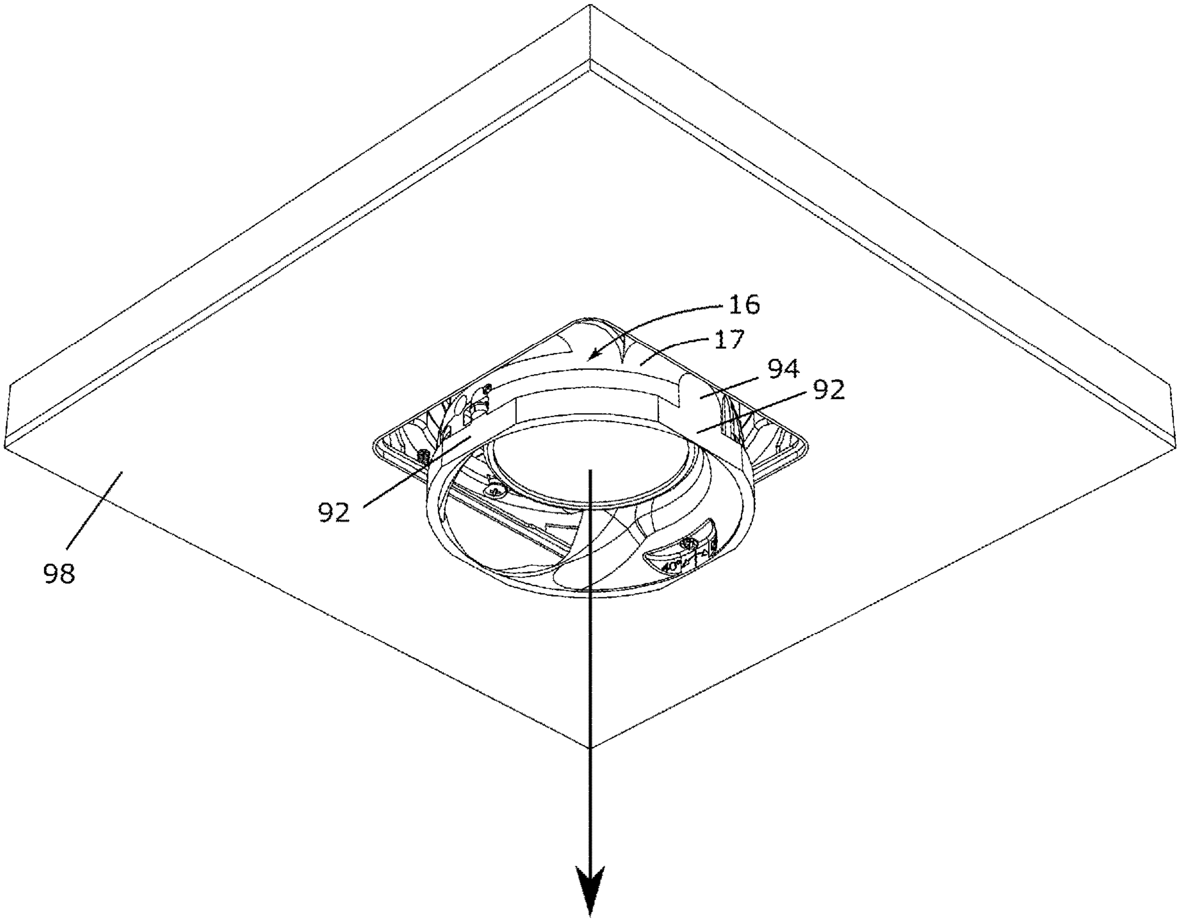
FIG. 37 is a perspective view of the optics housing passing through the square ceiling opening (square mud plate is mudded in)

Referring to FIG. 35, after a square mud plate 106 is mudded into the ceiling 198 and one desires to withdraw the optics housing 16 from the ceiling (for example, to replace certain lighting components), if there is a removable reflector 108 installed in the collar, it is removed. Referring to FIG. 36, one can then insert a compatible screwdriver or tool to loosen the screws securing the parts of the retaining ring 20 inside the collar 18. Separate parts of the retaining ring can be individually withdrawn through the square ceiling opening whereas it would not be possible to do so with a one-piece round retaining ring. Removing the retaining ring 20 allows disengagement of the abutment surface 91 of the shell 17 from the insertion stop 74 of the collar 18. Once the flat sides 92, 94 of the shell 17 are aligned with the square opening of the ceiling, the optics housing 16 (and the components attached to it) may be withdrawn from the ceiling opening. After replacing any components, the shell optics housing 16 (and the components attached thereto) may be inserted back into the ceiling 98 and secured to the collar 18 by the retaining ring 20.

The optics housing 16 may provide a tilting feature for the assembly. In the preferred embodiment, referring to FIGS. 40A, on one side of the optics housing 16, the shell 17 is coupled to the heat sink 12 by a plate 76 comprising an arcuate guide slot 77. Referring to FIG. 41A, on the opposite side, the shell 17 is rotatably coupled to the heat sink 12 by one or more arms 78 (preferably by a pair of arms). This connection provides an adjustable tilt feature for the assembly 10 such that the heat sink 12 (and the light source 14 and conical reflector 82 coupled to it) may be tilted in relation to the shell 17.

Figure 44B:
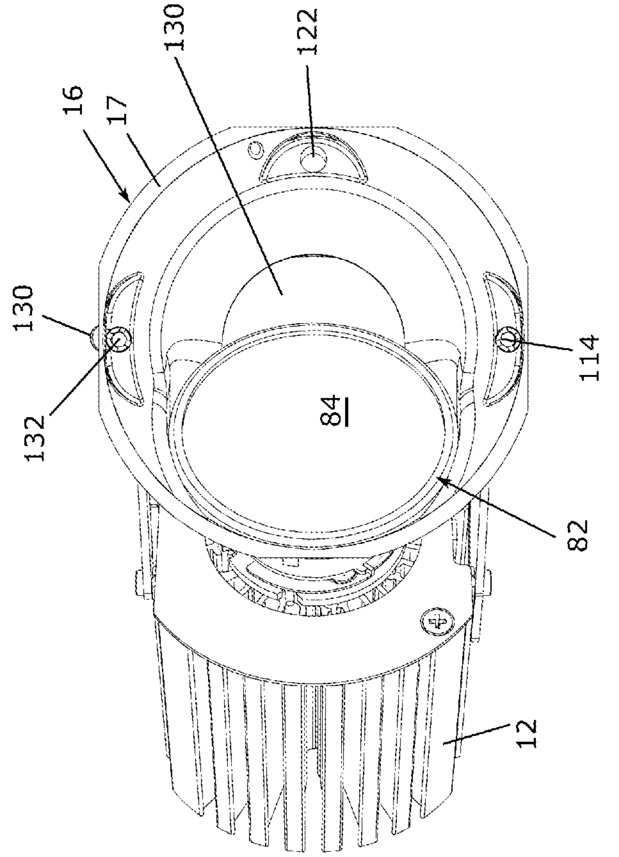
FIGS. 44A & B is a bottom view of the assembly (without the collar) in a down position and a tilt position.
Figure 44A:
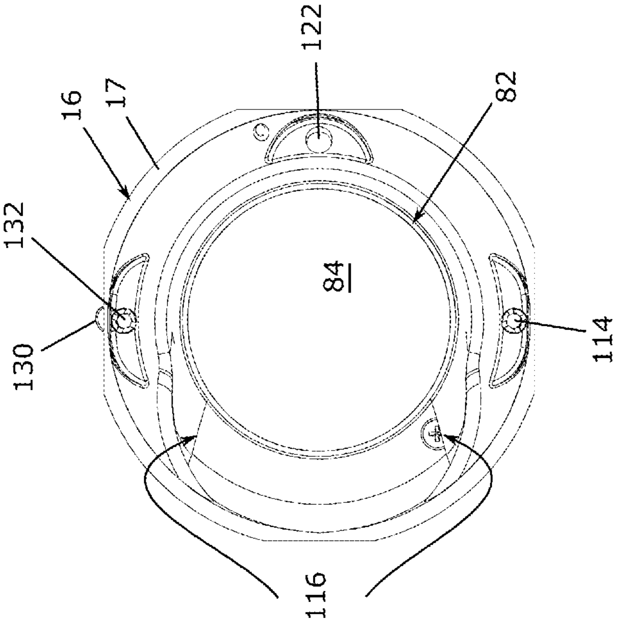

The plate 76 and arms 78 enable the heat sink 12 (and the components coupled to it) to tilt with respect to the vertical y-axis of the assembly 10 and assume a desired tilt position. Tilting of the heat sink 12 (and the components coupled to it) is guided by a fastener or pin 110 that is threaded through the arcuate guide slot 77 of the plate 76 and coupled to a vertical threaded rod 112 fixed to the shell 17 adjacent the plate 76. Referring to FIG. 44, the threaded rod 112 corresponds to an aperture 114 (shown in FIG. 44) on the inner concave surface of the shell 17 for inserting a compatible screwdriver or other tool to rotate the threaded rod 112. Rotating the threaded rod 112 moves the fastener/pin 110 up and down the threaded rod 112 as well as along the guide slot 77 which in turn tilts the heat sink 12 (and the components coupled to it).

Figure 40B:
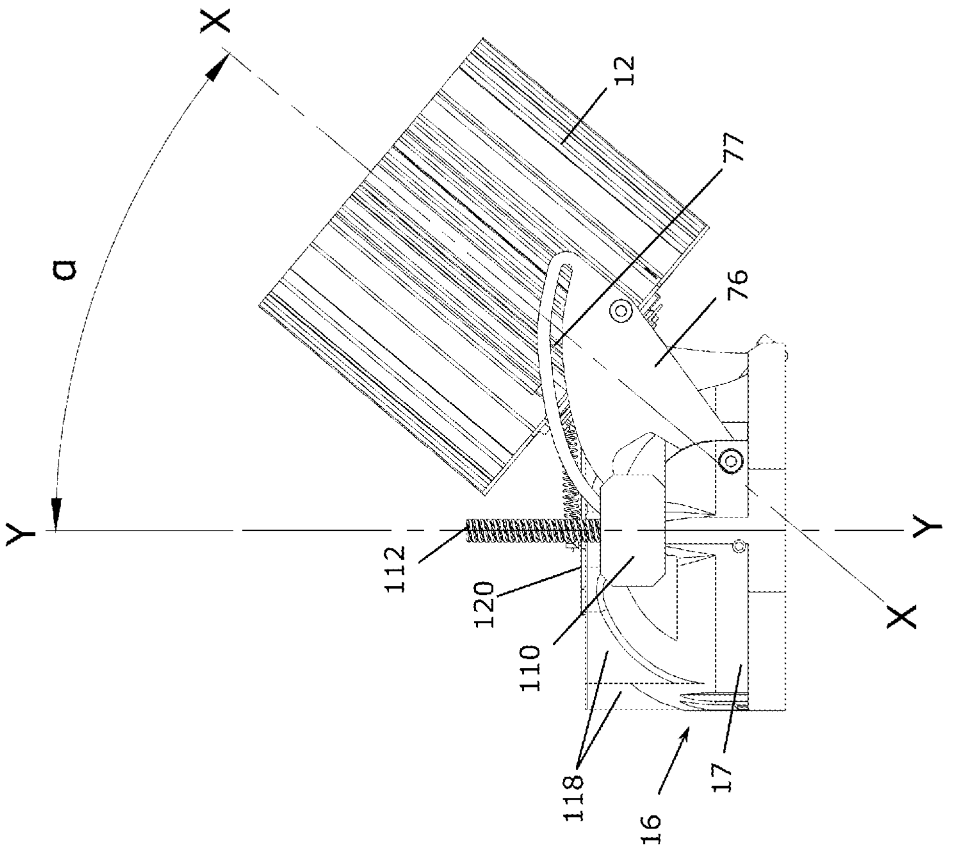
FIGS. 40A & B are side views of the assembly (without the collar) in a down position and a tilt position.
Figure 40A:
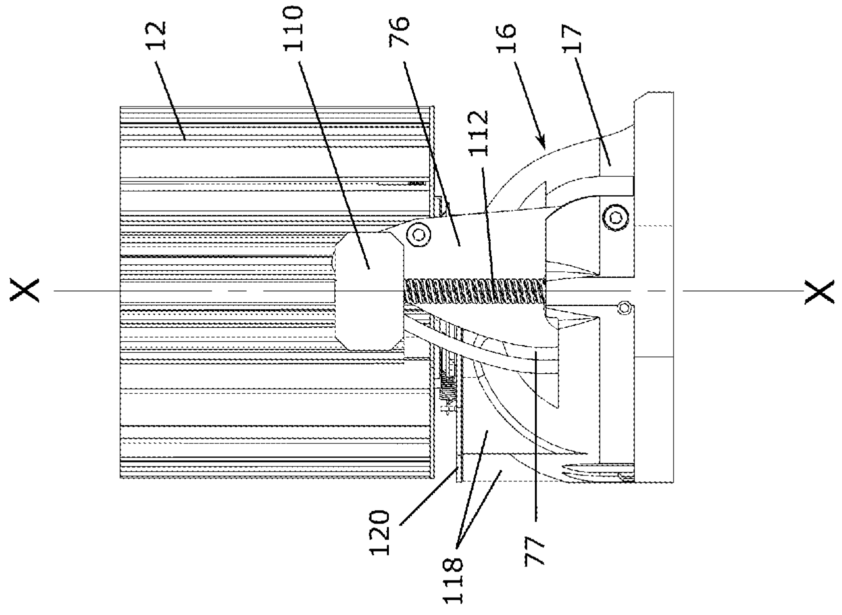
Figure 41B:
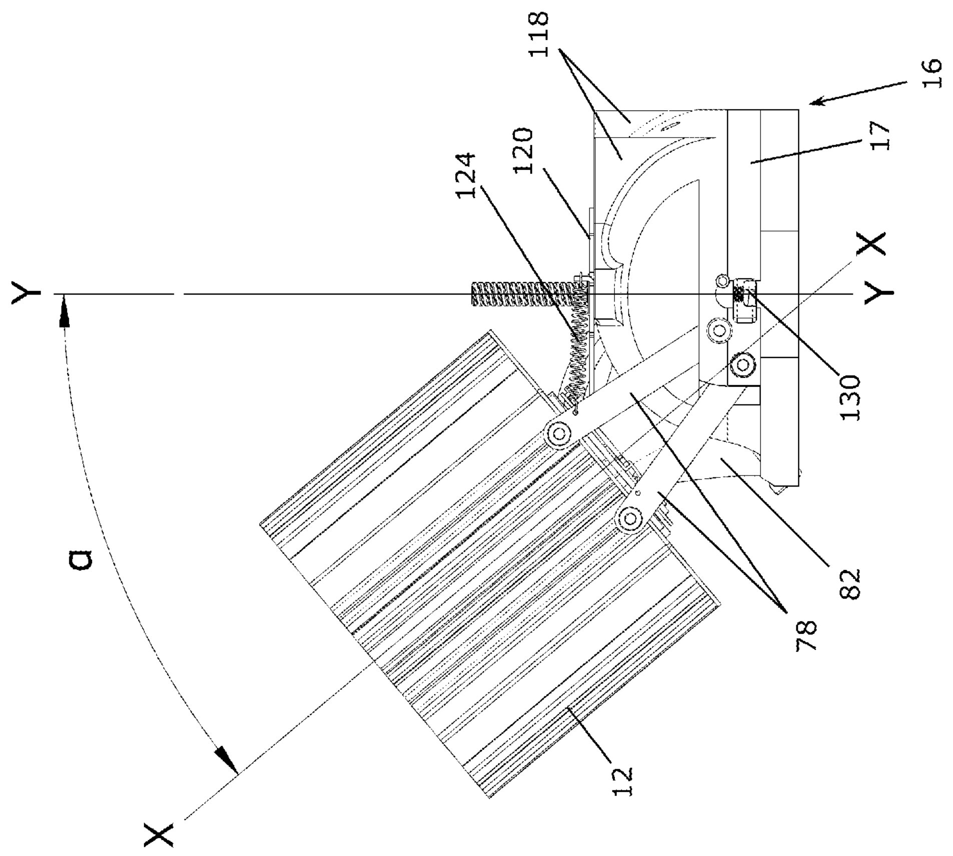
FIGS. 41A & B are other side views of the assembly (without the collar) in a down position and a tilt position.
Figure 41A:
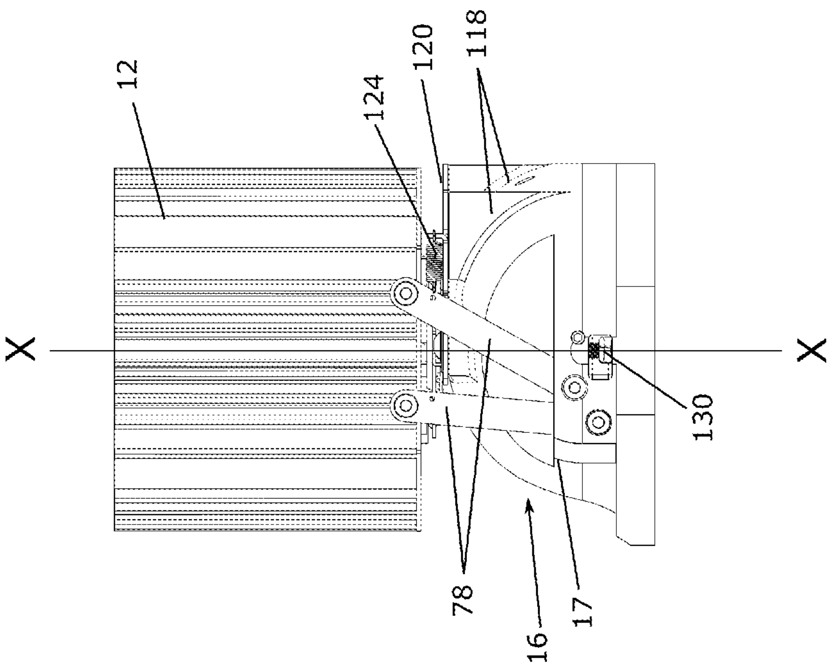

Referring to FIGS. 40A and 40B, when the fastener/pin 110 is at the top of the threaded rod 112 adjacent the heat sink 12, the assembly 10 is in a "down" position in which a central axis X-X of the heat sink 12 is parallel with the vertical y-axis of the assembly 10. As the threaded rod 112 is rotated, the fastener/pin 110 travels down the threaded rod 112 and along the guide slot 77, and the heat sink 12 begins to tilt transforming the assembly 10 into a "tilt" position in which the central axis X-X of the heat sink 12 is oriented at an angle "a" with respect to the vertical y-axis of the assembly 10. The maximum tilt angle "a" is preferably 40 degrees.

Figure 42B:
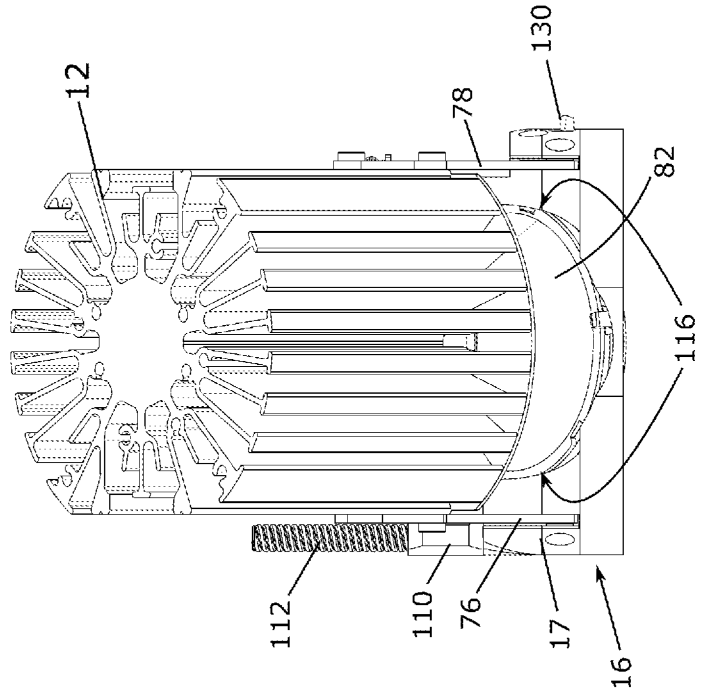
FIGS. 42A & B are further side views of the assembly (without the collar) in a down position and a tilt position.
Figure 42A:
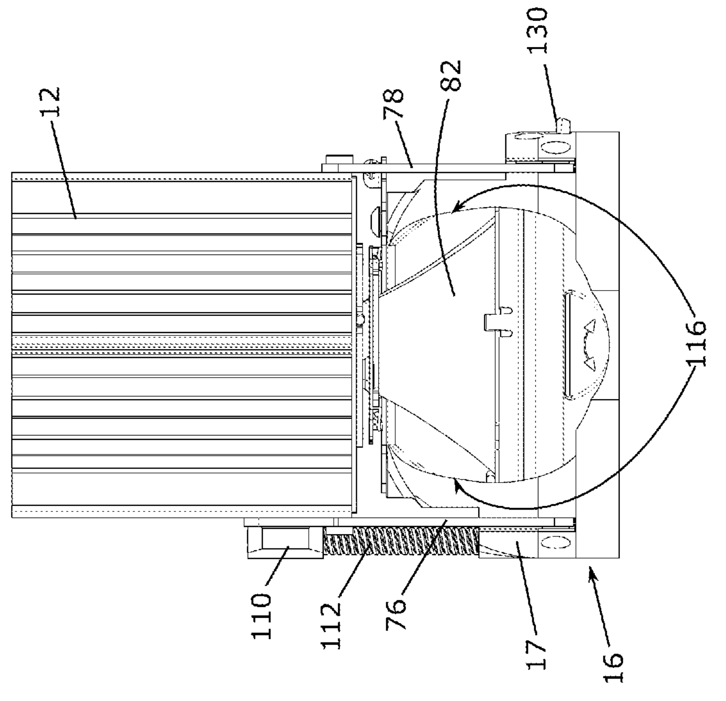

Referring to FIG. 42, the shell 17 may comprise a side opening 116 extending down the side of the shell 17 between the plate 76 and the arms 78 which the heat sink 12 tilts downwards towards. The purpose of this opening 116 is to prevent the conical reflector 82 (which is coupled to the heat sink 12) from hitting the inner concave surface of the shell 17 as the heat sink 12 (and the components coupled to it) is tilted and the assembly 10 transforms into a tilt position.

Figure 43A:
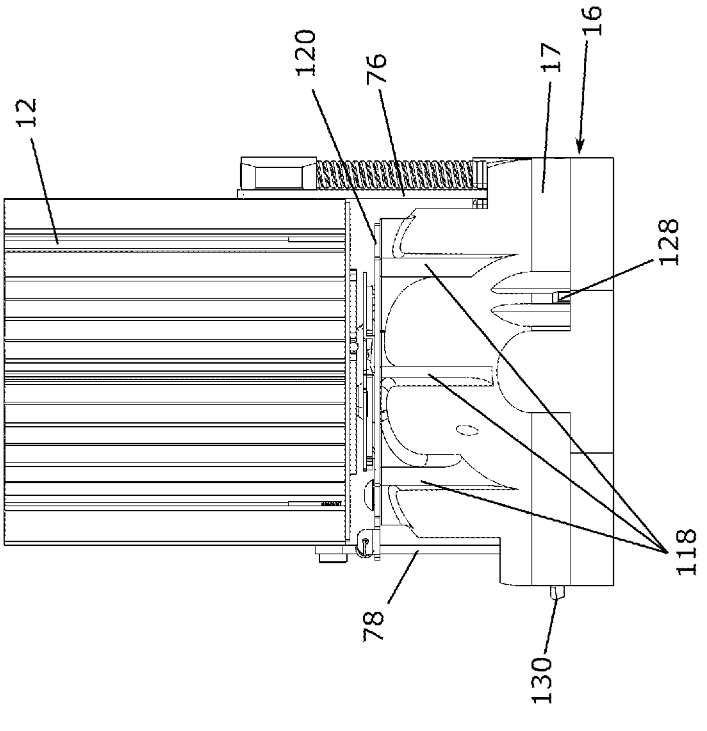
FIGS. 43A & B are other side views of the assembly (without the collar) in a down position and a tilt position.
Figure 43B:
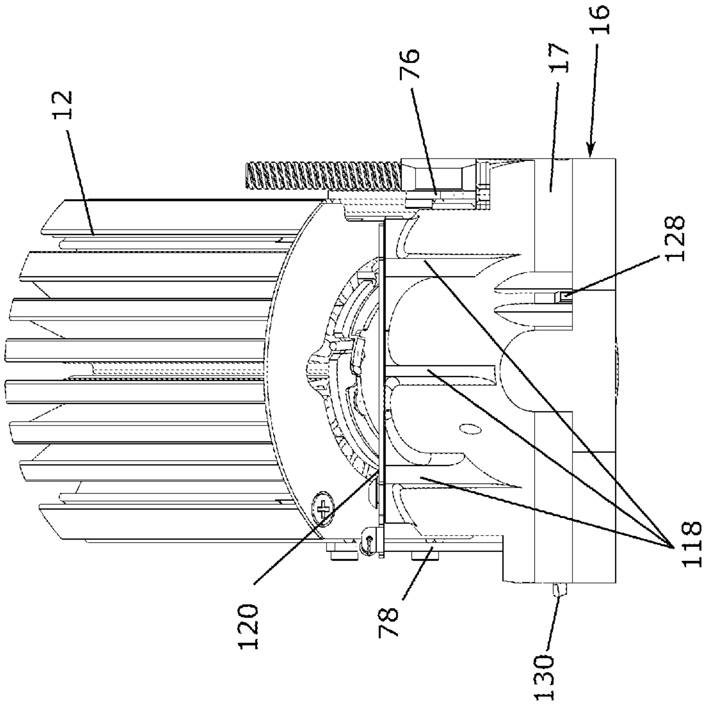

Referring to FIG. 43, on the opposite side of the shell 17 between the plate 76 and the arms 78, the shell 17 may comprise one or more triangular fins 118 extending from the outer convex surface of the shell 17. The top surface of each triangular fin 118 is aligned with the top surface of the shell 17 and form a flat surface to support a shield 120 slidably coupled to the top of the shell 17. The shield 44 lies horizontally on top of the shell 17 (and triangular fins 42), below the light source 14 and heat sink 12, and is shaped to accommodate the conical reflector 82 received through where the top of the shell 17 is truncated.

One side of the shield 120 is also coupled to one of the arms 78 by a spring 124. When the heat sink 12 tilts (and the arm 78 moves in the same direction as the tilting movement), the arm 78 and the spring 124 pulls the shield 120 causing it to slide horizontally across the triangular fins 118 and top of the shell 17 in the same direction as the tilting movement to cover a portion of the truncated top of the shell 17 that would otherwise be visible behind the conical reflector 82 from below (shown in FIG. 40). When the assembly 10 returns to a down position, the shield 120 returns to its position on top of the triangular fins 42.

The assembly 10 may further comprise a rotation feature whereby the optics housing 16 (and the components coupled to it) may swivel or rotate in relation to the collar 18, about the vertical y-axis of the assembly 10. Referring to FIG. 4, the rim 90 of the shell 17 is held between the insertion stop 74 (of the collar 18) and the retaining ring 20 such that the rim 90 may swivel or rotate between the insertion stop 74 and the retaining ring 20. A compatible tool may be inserted into the collar 18 from below to access a rotation aperture 122 (shown in FIG. 44) on the inner surface of the shell 17. Once the tool is inside the rotation aperture 122, one can move the tool clockwise or counter-clockwise to rotatably move the shell 17 about the collar 18. As the optics housing 16 is swivelled or rotated, the bottom of the shell 17 slides against the retaining ring 20, the outer vertical surface of the rim 90 may slide against the inner surface of the collar 18 (between the insertion stop 74 and retaining ring 20), and the abutment surface 91 of the shell 17 may slide against the insertion stop 74.

The collar 18 may further comprise an arm 126 (shown in FIG. 12) preferably pivotally coupled to the collar 18 adjacent the insertion stop 74. The pivotal arm 127 extends inwards such that it rests on top of the abutment surface 91 of the shell rim 90. As optics housing 16 rotates about the collar 18, the pivotal arm 126 slides against the abutment surface 91 until it hits a rotation stop 128 formed by a protrusion protruding from the outer surface of the shell 17 into the width of the abutment surface 91. This prevents the light assembly 10 from rotating more than 360 degrees in one direction.

The shell 17 may further comprise an abutment wedge 130 preferably pivotally coupled to the shell 17 by a fastener adjacent the abutment surface 91, that acts as a rotation lock mechanism for the light assembly. When disengaged, the abutment wedge 130 rests within a recess 134 (shown in FIG. 6A) on the outer surface of the shell 17. To lock the shell 17 against rotation, one may insert a compatible screwdriver or tool into the collar 18 and access a rotation lock aperture 132 (shown in FIG. 44) on the inner surface of the shell 17 to turn the fastener coupling the abutment wedge 130 to the shell 17 which swings the abutment wedge 130 out of the recess 134 to push against the inner side of the collar, thereby preventing the shell from rotating.

The features of the invention allow the supply of a kit comprising the versatile collar describe above, an optics housing as described above along with both round and square trim dimensioned such that the square trim and the flattened rim and surfaces of the shell coincide with the straight edges of the square trim, allow the optics housing to be removed past a square trim. The same can be done with a kit comprising round and square mud plates.

It will be appreciated by those skilled in the art that the preferred embodiment has been described in some detail but that certain modifications may be practiced without departing from the principles of the invention.

The invention claimed is:

1. A method of installing a downlight assembly in a ceiling opening, the method comprising:

inserting a collar in the ceiling opening, the collar comprising;

a cylindrical sleeve;

a flange structure outward around a bottom edge of the sleeve for abutting against an underside of the ceiling;

a first circular shoulder about the interior of the sleeve, the shoulder including bores for receiving threaded fasteners;

at least two feet disposed within recesses in an exterior of the cylindrical sleeve and pivotally coupled to the sleeve by respective ones of the threaded fasteners;

rotating the threaded fasteners to pivot the feet outwards above an upper surface of the ceiling and clamp the ceiling between the feet and the flange structure;

inserting the downlight assembly upwards through the collar to abut against a circular abutment surface disposed about the interior of the sleeve; and seating a retainer ring assembly against a second circular shoulder inboard of the first circular shoulder, the retainer ring assembly retaining the downlight assembly against the abutment surface.

2. The method according to claim 1 further comprising magnetically coupling a trim to the retainer ring assembly.

3. The method according to claim 1 further comprising:

prior to inserting the downlight assembly, installing a square mud plate about the ceiling opening, the flange structure of the collar including four flange elements each comprising a straight edge the straight edges lying along sides of square mud plate so that the flange structure is hidden from view;

inserting the downlight assembly through a square aperture in the square mud plate, the downlight assembly including an optics housing having a rim, a perimeter of the rim comprising four equally spaced flattened rim surfaces, the rim surfaces lying along sides of the square aperture;

wherein the retainer ring assembly forms a composite ring comprising at least two separable ring components, and seating the retainer ring assembly comprises inserting said separable ring components through the square aperture and seating the separable ring components against the second circular shoulder to form the composite ring.

4. The method according to claim 1 further comprising:

prior to inserting the downlight assembly, installing a circular mud plate about the ceiling opening, the flange structure including curved edges lying on a perimeter of the circular mud plate so that the flange structure is hidden from view; and inserting the downlight assembly through a round aperture in the circular mud plate.

5. A collar for mounting a downlight assembly in a ceiling, the collar comprising:

a cylindrical sleeve insertable in an opening in the ceiling, the sleeve having a bottom edge;

an insertion stop projecting inwardly from an inner surface of the sleeve, the insertion stop distal to the bottom edge;

a circular shoulder about the interior surface of the sleeve for seating a retainer assembly, the circular shoulder located between the bottom edge and the insertion stop;

a plurality of feet pivotably coupled to an outer surface of the sleeve for abutting against a top side of the ceiling; and four flange segments extending radially outward from the bottom edge of the sleeve for abutting against an underside of the ceiling;

wherein the flange segments are evenly spaced about a perimeter of the bottom edge.

6. The collar according to claim 5, the sleeve including a plurality of recesses in the outer surface, wherein each foot of said plurality of feet is disposed in a respective one of said recesses, wherein each foot is pivotable between a first position within the respective recess and a second position extending outward from the outer surface of the sleeve.

7. The collar according to claim 6, wherein each foot is coupled to the sleeve by a threaded rod inserted in a first threaded bore thereof.

8. The collar according to claim 7, wherein rotation of the threaded rod in a first direction pivots the respective foot from the first position to the second position, and wherein further rotation of the threaded rod in the first direction clamps the ceiling between the respective foot and the flange segments.

9. A kit comprising:

a collar according to claim 5;

a downlight assembly comprising an optics housing, the optics housing having a rim disposed about a perimeter thereof, the rim having an abutment surface for abutting against the insertion stop of the collar; and a retainer assembly seatable on the circular shoulder for retaining the rim of the optics housing against the insertion stop.

10. The kit according to claim 9, wherein the optics housing is rotatable relative to the collar against the abutment surface, and wherein the optics housing includes an abutment wedge selectively engageable against the inner surface of the sleeve to prevent rotation of the optics housing relative to the collar.

11. A kit comprising:

a collar according to claim 5; and a square trim, a perimeter of the square trim lying along the straight edges of the flange segments of the collar so that the flange segments are covered by the square trim.

12. A kit comprising:

a collar according to claim 5;

an optics housing comprising a frusto-spherical shell having a rim, a perimeter of said rim comprising four equally spaced flattened rim surfaces; and a square mud plate having a square aperture, a perimeter of the square mud plate lying along the straight edges of the flange segments of the collar so that the flange segments are covered by the square mud plate; wherein the flattened rim surfaces are dimensioned to allow insertion of the optics housing through the square aperture of the square mud plate.

13. The kit according to claim 12, the kit comprising:

a downlight assembly comprising an optics housing, the optics housing having a rim disposed about a perimeter thereof, the rim having an abutment surface for abutting against the insertion stop of the collar; and a retainer assembly seatable on the circular shoulder for retaining the rim of the optics housing against the insertion stop; wherein the trim is magnetically couplable to the retainer assembly.

14. A kit comprising:

a collar according to claim 5; and a circular trim, a perimeter of the circular trim lying along the curved edges of the flange segments of the collar so that the flange segments are covered by the circular trim.

15. A kit comprising:

a collar according to claim 5;

an optics housing comprising a frusto-spherical shell; and a circular mud plate having a circular aperture, a perimeter of the circular mud plate lying along the curved edges of the flange segments of the collar so that the flange segments are covered by the circular mud plate;

wherein the optics housing is dimensioned to allow insertion of the optics housing through the circular aperture of the circular mud plate.

16. The kit according to claim 15, the kit comprising:

a downlight assembly comprising an optics housing, the optics housing having a rim disposed about a perimeter thereof, the rim having an abutment surface for abutting against the insertion stop of the collar; and a retainer assembly seatable on the circular shoulder for retaining the rim of the optics housing against the insertion stop; wherein the trim is magnetically couplable to the retainer assembly.

* * * * *